US012747341B2

(12) United States Patent
Tiefenbacher

(10) Patent No.: US 12,747,341 B2
(45) Date of Patent: Sep. 29, 2026

(54) BIODEGRADABLE, COMPOSTABLE MOLDING MASS COMPOSITIONS, MOLDED ARTICLES AND METHODS OF MANUFACTURE

(71) Applicant: EPS GLOBAL MARKETING LTD., Christ Church (BB)

(72) Inventor: Karl F. Tiefenbacher, Absam (AT)

(73) Assignee: EVPS GLOBAL MARKETING LTD., Christ Church (BB)

( * ) Notice: Subject to any disclaimer, the term of this patent is extended or adjusted under 35 U.S.C. 154(b) by 1203 days.

(21) Appl. No.: 17/619,842

(22) PCT Filed: Jun. 18, 2020

(86) PCT No.: PCT/IB2020/000518
§ 371 (c)(1),
(2) Date: Dec. 16, 2021

(87) PCT Pub. No.: WO2020/254877
PCT Pub. Date: Dec. 24, 2020

(65) Prior Publication Data

US 2022/0325078 A1 Oct. 13, 2022

Related U.S. Application Data

(60) Provisional application No. 62/864,100, filed on Jun. 20, 2019.

(51) Int. Cl.

| | |
|---|---|
| ***C08L 3/02*** | (2006.01) |
| ***B29B 7/90*** | (2006.01) |
| ***B29C 39/02*** | (2006.01) |
| ***B29C 39/38*** | (2006.01) |
| ***C08L 97/02*** | (2006.01) |
| *B29K 105/06* | (2006.01) |
| *B29L 31/00* | (2006.01) |

(52) U.S. Cl.
CPC *C08L 3/02* (2013.01); *B29B 7/90* (2013.01); *B29C 39/02* (2013.01); *B29C 39/38* (2013.01); *C08L 97/02* (2013.01); *B29K 2003/00* (2013.01); *B29K 2105/06* (2013.01); *B29K 2995/006* (2013.01); *B29L 2031/712* (2013.01); *C08L 2201/06* (2013.01); *C08L 2205/025* (2013.01); *C08L 2205/03* (2013.01); *C08L 2205/06* (2013.01); *C08L 2205/16* (2013.01)

(58) Field of Classification Search
CPC ........ C08L 3/02; C08L 97/02; C08L 2201/06; C08L 2205/025; C08L 2205/03; C08L 2205/06; C08L 2205/16; B29B 7/90; B29C 39/02; B29C 39/38; B29K 2003/00; B29K 2105/06; B29K 2995/006; B29L 2031/712
USPC ........................................................ 524/47
See application file for complete search history.

(56) References Cited

U.S. PATENT DOCUMENTS

| | | | | |
|---|---|---|---|---|
| 4,208,432 | A | 6/1980 | Noborio et al. | |
| 5,376,320 | A * | 12/1994 | Tiefenbacher | A21D 2/14 264/300 |
| 5,849,152 | A | 12/1998 | Arnold et al. | |
| 2003/0207038 | A1 | 11/2003 | Han et al. | |
| 2009/0012210 | A1 | 1/2009 | Speer et al. | |

FOREIGN PATENT DOCUMENTS

| | | | |
|---|---|---|---|
| CN | 1446735 | A | 10/2003 |
| JP | 5-505104 | A | 8/1993 |
| JP | 2539125 | B2 | 7/1996 |
| JP | 8-225777 | A | 9/1996 |
| JP | 11-505882 | A | 5/1999 |
| JP | 2007-517919 | A | 7/2007 |
| JP | 2010-532298 | A | 10/2010 |
| JP | 2010-254859 | A | 11/2010 |
| KR | 101650710 | B1 | 8/2016 |
| NL | 8202295 | A | 1/1983 |
| RU | 2126427 | C1 | 2/1999 |
| RU | 2160288 | C2 | 12/2000 |
| RU | 2429131 | C2 | 9/2011 |
| RU | 2443122 | C2 | 2/2012 |
| RU | 2496792 | C2 | 3/2012 |
| RU | 2524382 | C2 | 7/2014 |
| WO | 97/23333 | | 7/1997 |
| WO | 03/059756 | A2 | 7/2003 |
| WO | 2010085569 | A1 | 7/2010 |

OTHER PUBLICATIONS

Basov, N.I. et al., "Quality control of polymeric materials", Edited by V.A. Braginskiy, 2nd edition, revised, Leningrad, Publishing House "Chemistry", 1990, 112 pgs. (p. 112) and Excerpt of English translation of Office Action dated Aug. 22, 2024 at pp. 6-7 in corresponding Russian Application No. 2021137587 regarding Basov et al.
International Search Report and Written Opinion for PCT/IB2020/000518 dated Nov. 9, 2020.
Lyshko, O.G., "The Choice of Starch for Regulating the Filtration and Rheological Properties of Drilling Biopolymer Fluids", Bulatov's Readings, 2017, vol. 3, pp. 154-159.

* cited by examiner

*Primary Examiner* — Kelechi C Egwim
(74) *Attorney, Agent, or Firm* — VERRILL DANA, LLP

(57) ABSTRACT

The invention features biodegradable, compostable molding mass compositions, molding masses, molded articles, coating solutions, and systems and methods for the manufacture of same.

6 Claims, 11 Drawing Sheets

BIODEGRADABLE, COMPOSTABLE MOLDING MASS COMPOSITIONS, MOLDED ARTICLES AND METHODS OF MANUFACTURE

STATEMENT REGARDING FEDERALLY SPONSORED RESEARCH OR DEVELOPMENT

Not Applicable.

BACKGROUND OF THE INVENTION

Waste streams of increasing volumes characterize the handling and distribution of many products of daily life. For example, in the food distribution and service industries, billions of voluminous non-biodegradable articles end up in the waste streams on every continent. Polymeric-coated carton based, or Styrofoam based products have expected lifetimes in the range of 10-100 years. Such articles are produced from non-environmental cost optimized, technically mature, mass production processes.

There is a growing public awareness that there is an environmental cost associated with these non-biodegradable materials, particularly when the materials are considered from production to disposal, that is from cradle to grave. These environmental costs may be significantly higher than, for example, their biodegradable or environmentally neutral alternatives.

Replacement of non-biodegradable materials is complex, however. Contemporary processing, packaging, storage, distribution, service, and consumption requires adequate packaging materials for a wide variety of fluid and solid goods. Distribution and food and beverage consumption requires a variety of disposable containers including but not limited to bowls, clamshells, containers, cups, baking pans, plates, trays, or other useful structures known in the art. Packaging must protect from environmental influences, deterioration, and damage, although the use of long duration packaging for short term applications is increasingly considered environmentally irresponsible.

Each year, disposable containers made from plastic coated paper or cardboard; various plastic materials such as polyethylene or PE, polypropylene or PP, polystyrene, and foamed polystyrene; glass; and metals are produced for both food and non-food applications. After relatively brief useful lives, billions of disposable containers enter waste streams where many are not easily degradable. Further, although broad attention has focused on making such articles more lightweight, the use of millions of tons of raw materials to manufacture such “light weight” articles has environmental costs For example, foamed polystyrene is lightweight, stable, and non-environmental cost optimized for the current applications. The manufacture of foamed polystyrene involves hazardous chemicals including benzene and styrene for the polystyrene, and traditional blowing and expanding agents for foaming. In recent years, there have been efforts towards less harmful blowing agents, however.

The recycling of the materials of disposable containers present its own environmental and political complexities.

In response to the above challenges, molded biodegradable articles based on flours, fibers, and inert inorganic fillers have been increasingly discussed in the last 25 years. The biodegradable articles of the current art do not appear to have broad application, however. Challenges include the identification of molding mass compositions which enable reliable thermal molding processing, post-thermal processing, and handling in the context of the high numbers of industrial manufacturing volumes. In addition, materials or articles which are sufficiently convenient and user-friendly for the end user are necessary to engender consumer willingness to substitute the sustainable article for the existing non-sustainable articles.

Current art teaches fluid or semi-liquid paste-like or batter like molding masses, or relatively harder dough-like molding masses. The surface properties of the molding mass and the mold along with the temperature and pressure conditions of the molding processes can require the use of release agents which result in mold residues. Such mold residues can change the surface properties of the mold after continuous use. For example, thermal degradation and polymerization of release lipids applied to the mold during demolding processes can result in residues on the mold. The mold residues produce a less smooth and dull mold surface with a potential change in heat transfer properties which in turn affects the smoothness and shine of the surfaces of the molded articles. Demolding salts and fatty acids can result in mineral residues which require periodic removal via chemical and/or physical intense cleaning which require production line stoppages, and which deteriorate the mold surface over time.

In addition, thermal processing of molding masses including fluid or semi-liquid batters or pastes, as taught in the current art, generate a lot of steam. The evolving steam in turn affects the quantity, size and distribution of voids in the molded article. Thermally molded articles generally can include at least some voids which are bigger in the center of the article and which decrease in size towards the edge of the article and are optically absent at the surface of the article. Internal pores controlled for size and quantity and distribution during the thermal molding step via evolving steam can result in the molded article having improved mechanical properties including for example, greater stability against breakage and/or improved bending angle without breakage. The resulting molded article can be more light weight thereby saving material. Too much evolving steam results in too large and/or too many internal voids being distributed in a non-uniform pattern, however. Such non-controlled internal void generation compromises the internal cohesion of the molded article.

The hard dough-like molding masses, as taught in the current art, can lead to irregular portioning and incomplete molding. At the demolding step, hard, dough-like masses can result in the clogging of mold extrusion vents, troubles with extruded molding material including bobbles, and/or fraying of edges.

There is a need to improve the properties of fully biodegradable disposables such as packaging containers, trays, plates, and bowls made from natural materials such as flours, fibers, and other components.

BRIEF SUMMARY OF THE INVENTION

The present invention features improved specific compositions based on water, starch and fibers. The starch component can include a combination of native and pregelatinized starches which can be in the form of a flour or powder. The specific composition can include a select mold release agent for a new residue-free release of the articles after thermal molding. The composition is prepared for a non-fluid, molding mass having a first plastic-elastic texture and consistency. The molding mass is formulated for the industrial manufacturing of molded biodegradable and compostable articles having second plastic-elastic texture and consistency. The molding mass compositions, molding masses, and preparation and processing methods of the invention enable the formation of molded articles and/or article parts having variety of shapes and structures. The invention also features further post-thermal molding processing and handling methods for formation of finished articles and article parts.

The following terms are defined for purposes of the present application:

The term "plasticity" refers to the deformation capacity of a material to undergo a non-reversible change of shape without rupture in response to a select applied force.

The terms "plastic" material(s)" refer to materials that can undergo non-reversible changes in shape without rupture responsive to a select applied force including a stress of intermediate magnitude.

The term "elasticity" refers to the deformation capacity of a material to undergo a reversible change in shape without rupture in response to a select applied force.

The term "elastic material(s)" refer to materials that can reversibly change in shape without rupture responsive to a select applied force including a stress of intermediate magnitude.

The term "plastic-elastic texture and consistency" refers to a material property including at least some plasticity and at least some elasticity.

The term "compostable", refers to a compostable material consistent with the standards of ASTM International, hereinafter "ASTM", formerly known as American Society for Testing and Materials. A compostable plastic is defined by the ASTM D6400 as "a plastic that undergoes degradation by biological processes during composting to yield carbon dioxide ($CO_2$), water, inorganic compounds, and biomass at a rate consistent with other known compostable materials and that leaves no visible, distinguishable, or toxic residue." The ASTM D6400—Test for Compostability covers plastics and products made from plastics that are designed to be compostable in municipal and industrial aerobic composting facilities. The ASTM D6400—Test for Compostability establishes the requirements for labeling of materials and products, including packaging made from plastics, as "compostable in municipal and industrial composting facilities." The properties tested in the ASTM D6400—Test for Compostability determine if plastics and products made from plastics will compost satisfactorily, including biodegrading at a rate comparable to known compostable materials. Further, the properties in the standard are required to assure that the degradation of these materials will not diminish the value or utility of the compost resulting from the composting process. The standard ASTM D6868-17 defines the Standard Specification for Labeling of End Items that Incorporate Plastics and Polymers as Coatings or Additives with Paper and Other Substrates Designed to be Aerobically Composted in Municipal or Industrial Facilities. This standard covers biodegradable plastics and products (including packaging), where plastic film or sheet is attached (either through lamination or extrusion directly onto the paper) to substrates and the entire product or package is designed to be composted in municipal and industrial aerobic composting facilities. This standard is intended to establish the requirements for labeling of materials and products, including packaging, using coatings of biodegradable plastics, as "compostable in municipal and industrial composting facilities." The properties in this standard are those required to determine if products (including packaging) using plastic films or sheets will compost satisfactorily, including biodegrading at a rate comparable to known compostable materials. Further, the properties in the standard are required to assure that the degradation of these materials will not diminish the value or utility of the compost resulting from the composting process.

The term "compostable" also refers to a compostable material consistent with the standards of ISO-International Organization for Standardization (international), hereinafter "ISO". The ISO 17088:2012 standard discusses the following features: a) biodegradation; b) disintegration during composting; c) negative effects on the composting process and facility; and d) negative effects on the quality of the resulting compost, including the presence of high levels of regulated metals and other harmful components.

The term "compostable" further refers to a compostable material consistent with the standards of CEN-European Committee for Standardization for the European Union, hereinafter "CEN". The CEN-EN 13432 compostability standard discusses the following features: a chemical test including disclosure of all constituents, and threshold values for heavy metals; biodegradability in controlled composting conditions (oxygen consumption and production of CO2): proof must be made that at least 90 percent of the organic material is converted into CO2 within 6 months; disintegration: after 3 months' composting and subsequent sifting through a 2 mm sieve, no more than 10 percent residue may remain, as compared to the original mass; a practical test of compostability in a semi-industrial (or industrial) composting facility: no negative influence on the composting process is permitted; and an ecotoxicity test: examination of the effect of resultant compost on plant growth (agronomic test).

The term "biodegradation" refers to the naturally-occurring breakdown of materials by microorganisms such as bacteria and fungi or other biological activity. Biodegradation as a naturally-occurring process is distinguishable from composting which is a human-driven process in which biodegradation occurs under a specific set of circumstances. The term "biodegradation" is consistent with the ASTM D5526-18 standard including the Standard Test Method for Determining Anaerobic Biodegradation of Plastic Materials Under Accelerated Landfill Conditions; the ASTM D5511-18 standard including the Standard Test Method for Determining Anaerobic Biodegradation of Plastic Materials Under High-Solids Anaerobic-Digestion Conditions; and ASTM D5338-15 standard including the Standard Test Method for Determining Aerobic Biodegradation of Plastic Materials Under Controlled Composting Conditions, Incorporating Thermophilic Temperatures.

The term "article or articles" refers or refer to complete article(s) and/or part(s) of a corresponding complete articles(s) which can then be used to assemble a corresponding complete articles(s).

The term "molded article(s)" refers or refer to articles(s) and/or part(s) of complete articles which have undergone thermal molding but which optionally can undergo post-thermal molding processing for the formation of finished complete article(s) and/or part(s) of complete article(s).

The term "finished article(s)" refers or refer to article(s) and/or part(s) of article(s) which are sufficiently finished for use and/or assembly for use.

The term "hydrate(s)" refers or refer to the attachment of water to the non-liquid soluble solid component(s) of the molding mass composition.

The term "pore(s)" refers or refer to a controlled generation of void(s) within for a non-limiting example a molded article during a thermal molding step.

The term "void(s)" refers to any kind of air-, steam-, gas-, water-, and/or liquid-filled holes within an otherwise solid article.

The invention can enable large industrial sized volume manufacturing of molded biodegradable and compostable articles. Specific or select molding mass compositions including water, starchy flours, fibers, and other optional or minor components are described. A new mold release system is provided. The invention features a substantially air-free, non-fluid, plastic-elastic molding mass produced by mixing and kneading. Process requirements for thermal molding of the molding mass into a biodegradable article and for further post-thermal processing and handling are provided. The molded biodegradable and compostable articles include, for non-limiting examples, different types of containers such as bowls, clamshells, containers, cups, egg trays, meat trays, pans for baking, plates, trays for any goods, or further useful object structures known in the art.

The composition of the molded biodegradable and compostable articles is such, that even in case of their discard in a conventional way into waste incineration or landfill, they are environmentally neutral, not causing additional environmental hazard.

Thus, the present invention overcomes problems in industrial manufacturing of biodegradable articles as discussed above.

An object of the invention includes providing biodegradable and compostable molding mass compositions including water, starchy flours, fibers, and minor or optional ingredients for stable continuous thermal molding processing and possible further post-thermal molding processing to achieve or to provide the compressive, tensile, flexural, and cohesive strength, porosity, stiffness, rigidity, and surface property requirements for the molded and ultimately finished articles.

An object of the invention includes providing a mold release system which avoids any substantial soiling to a corresponding mold at thermal molding temperatures of around 200° C. up to a maximum of 225° C., and preferably up to a maximum of 215° C., and in a range of 185° C. to 225° C., and preferably in a range of 190° C. to 215° C., and more preferably in a range of 190 to 210° C. The avoidance of mold soiling with polymeric and/or mineral residues avoids undesirable modification of the surface of the corresponding mold in continuous operation.

An object of the invention includes providing a molding mass with improved internal cohesion and predetermined hydrophobic properties through a select sizing or sizing system for the plurality of select starch granules and fibers of the molding mass composition.

An object of the invention includes providing a molding mass that can be prepared for a substantially smooth, first plastic-elastic texture and consistency, wherein the molding mass which can then be divided and/or portioned into select and substantially exact portions into a corresponding target mold while substantially reducing or eliminating the risks or possibilities for under- or over-filling of the corresponding target mold.

An object of the invention includes providing a molding mass that can fill substantially homogenously a corresponding target mold through, for example, the use of a select sizing system for the molding mass. The molding mass sizing system eliminates and/or avoids large fiber inclusions which would otherwise embed non-homogeneously in the matrix of the molded article, and/or clog extrusion openings of the corresponding target mold. At the same time, the risk of fraying at the articles edges during the demolding step is substantially reduced.

An object of the invention includes providing a molding mass which avoids an overly and/or excess generation of steam during thermal processing thereby producing a controlled sized distribution of pores within the structural matrix of molded article and reducing and/or eliminating the risk of forming oversized, an over-quantity and/or a non-uniform distribution pattern of voids in the molded article.

Objects of the invention include providing a molding mass having a first plastic-elastic texture and consistency for relatively fast thermal molding at a temperature of around 200° C. up to a maximum of 225° C., and preferably up to a maximum of 215° C., and more preferably in a range of 190° C.-to 210° C., wherein the molding mass can be characterized by a texture and consistency for relatively easy and substantially even distribution in the target mold and the avoidance of components or characteristics which can cause a change in coloration in the molded article due to thermal browning or caramelization reactions.

An object of the invention includes providing a process for mixing, portioning, and exact deposition of the molding mass.

Objects of the invention includes providing dedicated equipment for continuous in-line mass production of molded and finished article(s).

An object of the invention includes the formation of molded articles which after a defined treatment are suitable for application including degradability and sustainability criteria.

In one aspect, the invention features a molding mass composition including: a liquid component; wherein the liquid component includes a water component; and a non-liquid soluble solid component; wherein the non-liquid soluble solid component includes a starch component and a fiber component; wherein a total liquid content in the molding mass composition is in a range of 57 wt. % to 65 wt. % based on a total mass of the molding mass composition; wherein a starch/fiber wt. % ratio is in a range of 94 wt. % of the starch component: 6 wt. % of the fiber component to 49 wt. % of the starch component: 51 wt. % of the fiber component; wherein the starch component includes a plurality of starch granules having a select granule diameter size range including a granule diameter lower limit and a granule diameter upper limit; and wherein the fiber component includes a plurality of fibers, each of the plurality of fibers having a fiber length in a range of 1-250 times the granule diameter upper limit.

In an embodiment, the invention features the molding mass composition wherein the fiber component has a size dispersion of in a range of 10 to 2500 microns.

In an embodiment, the invention features the molding mass composition wherein the starch component has a size dispersion in a range of 1 μm to 120 μm.

In an embodiment, the invention features the molding mass composition wherein the starch component is a starch component selected from the group consisting of a native starch, a chemically modified native starch, a physically modified native starch, a genetically modified native starch, and a combination of at least two of the afore-mentioned starch components.

In an embodiment, the invention features the molding mass composition wherein the starch component includes a native potato starch.

In an embodiment, the invention features the molding mass composition wherein the starch component comprises a physically modified starch having a pregelatinized form.

In an embodiment, the molding mass composition further includes a mold release agent.

In an embodiment, the mold release agent includes a saturated long chain fatty acid having a chain length including a minimum of twelve carbon atoms.

In an embodiment, the invention features the molding mass composition wherein the mold release agent comprises an acid selected from the group consisting of a lauric acid, a myristic acid, a palmitic acid, a stearic acid, and an arachidic acid.

In an embodiment, the invention features the molding mass composition wherein the mold release agent is in a form of a powder having a plurality of mold release particles, each particle having a mesh size of less than 80 mesh.

In an embodiment, the invention features the molding mass composition wherein the mold release agent is in a ratio of 0.1 to 2.4 wt. % based on a total mass of the non-liquid soluble solid component in the molding mass composition.

In an embodiment, the molding mass composition further includes a texturizer.

In an embodiment, the invention features the molding mass composition wherein the texturizer is selected from the group consisting of a reactive inorganic component, a non-reactive inorganic component, and a combination of the two afore-mentioned components.

In an embodiment, the invention features the molding mass composition wherein the molding mass composition includes a texturizer including an inorganic component; and wherein a content of the inorganic component in the molding mass composition is within a range of greater than 0 to 16.5 wt. % based on a total non-liquid soluble solid component of the molding mass composition.

In an embodiment, the molding mass composition further includes a plasticizer additive; wherein the plasticizer is urea.

In an embodiment, the invention features the molding mass composition wherein the urea has a concentration in a range of greater than 0 wt. % to 9 wt. % based on a total mass of the starch component.

In an embodiment, the molding mass composition further includes a plurality of borate ions at a concentration in a range of greater than 0 to 2 mmol of borate per kilogram of the starch component.

In an embodiment, the invention features the molding mass composition, wherein the molding mass composition undergoes a mixing and kneading process for formation of the molding mass having a first plastic-elastic texture and consistency.

In another aspect, the invention features a method for preparing a molding mass including the steps of: selecting a liquid component; wherein the liquid component includes a water component; selecting a non-liquid soluble solid component; wherein the non-liquid soluble solid component includes a starch component and a fiber component; wherein a starch/fiber wt. % ratio is in a range of 94 wt. % of the starch component: 6 wt. % of the fiber component to 49 wt. % of the starch component: 51 wt. % of the fiber component; wherein the starch component includes a plurality of starch granules having a select granule diameter size range including a granule diameter lower limit and a granule diameter upper limit; and wherein the fiber component includes a plurality of fibers, each of the plurality of fibers having a fiber length in a range of 1-250 times the granule diameter upper limit; mixing and kneading the liquid component and the non-liquid soluble solid component using a preparation system for forming a molding mass having a first plastic-elastic texture and consistency characterized by a total liquid content in the molding mass including the liquid content in a range of 57 to 65 wt. % based on a total mass of the molding mass composition.

In an embodiment, the invention features the method for preparing a molding mass wherein the mixing and kneading step includes a step of adding step-wise the liquid component to the non-liquid soluble solid component during the mixing and kneading step.

In an embodiment, the method for preparing a molding mass further includes a step of producing a vacuum in the preparation system for substantially removing or preventing a gas from entering into the molding mass.

In an embodiment, the method for preparing a molding mass further includes the steps of: providing a target mold in an open configuration; and depositing a select portion of the molding mass into the target mold for filling a detail of the mold; wherein the select portion has a select portion volume less than a volume of the target mold.

In an embodiment, the method for preparing a molding mass further includes the steps of: closing the target mold as necessary; and heating the target mold filled with the molding mass to a select curing temperature in a range of 185° C. to 225° C. for a select curing time period for thermally curing the molding mass for forming the molded article having a second plastic-elastic texture and consistency characterized by a molded article residual liquid content of ≤6 wt. % based on a total mass of the molded article; wherein after thermal curing, no substantial steam pressure remains in a structural matrix of the molded article; and wherein after thermal curing, the molding mass is solidified beyond a glass point of the structural matrix of the molded article.

In an embodiment, the method for preparing a molding mass further includes the steps of: passing the molded article into an enclosed humidification section or chamber; and providing a humid air flow into the humidification section or chamber until the molded article has a water activity in a range of 0.45 to 0.70; wherein a safe microbiological condition is maintained in the enclosed humidification section or chamber.

In another aspect, the invention features a biodegradable, compostable coating solution for a molded article including a compostable liquid solvent base portion and a compostable solids portion.

In one embodiment, invention features the biodegradable, compostable coating solution wherein the compostable liquid solvent base comprises water.

In yet another aspect, the invention features a biodegradable, compostable coating system including a coating zone including a spray device and a heating device.

These and other aspects, features, advantages, and objects will be further understood and appreciated by those skilled in the art by reference to the following specification, claims and appended drawings.

BRIEF DESCRIPTION OF THE SEVERAL VIEWS OF THE DRAWINGS

The appended drawings support the detailed description of the invention and refer to exemplary embodiments. The appended drawings are considered to be in no way limiting to the full scope of the invention.

In the drawings.

DETAILED DESCRIPTION OF THE INVENTION

Figure 1:
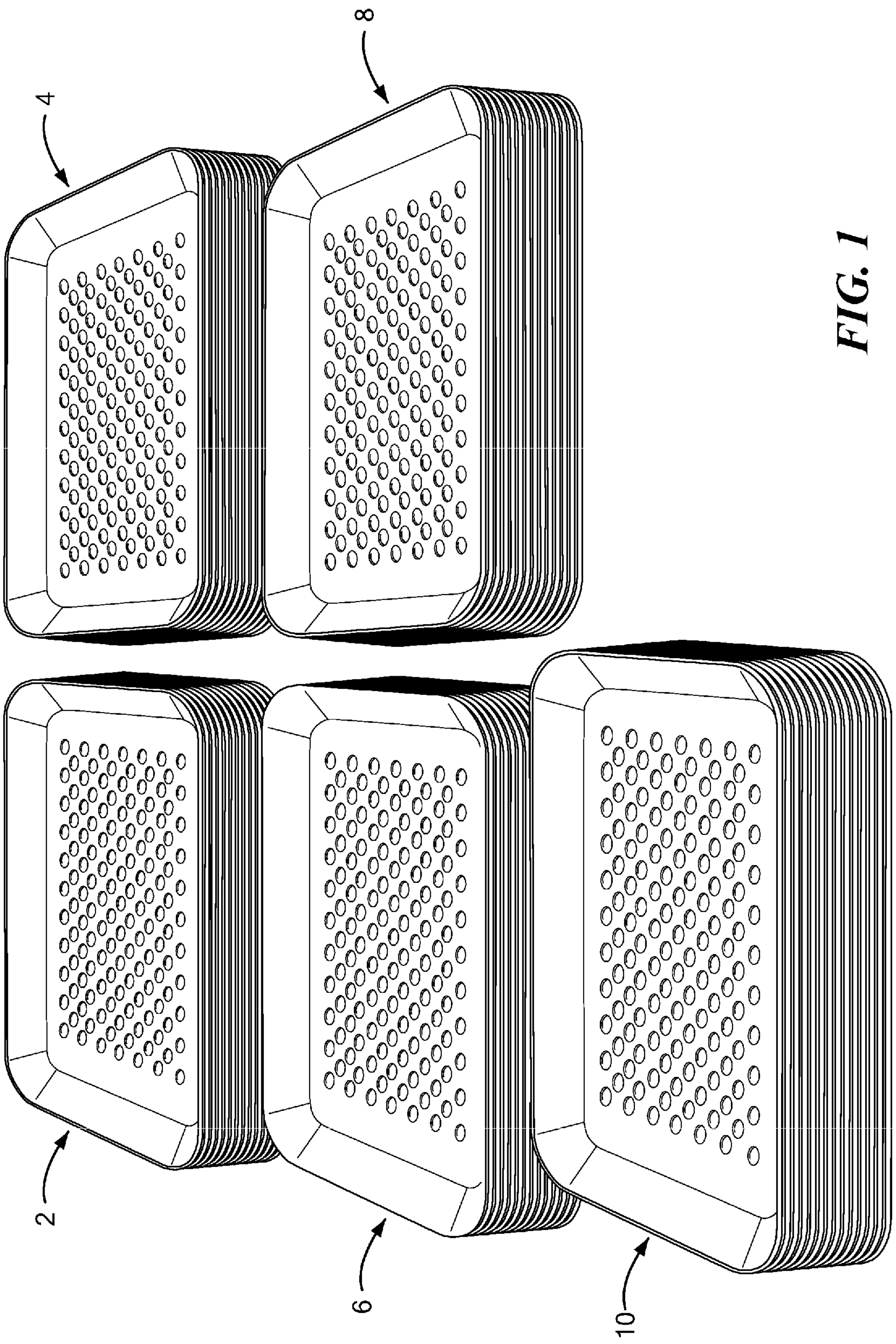
FIG. 1 shows perspective views of molded articles including trays according to exemplary non-limiting embodiments of the invention.

In the current art, there are different approaches to the manufacture of molded biodegradable articles based on a water-mediated forming of dough- or batter-like molding masses.

Some current art approaches teach compositions dominated by fibrous materials. The flour component provides a glue which connects wet fibrous preforms into a stable matrix. The fiber material provides mechanical stability and cohesion in the molding phase. The molding mass is inserted into the target mold. Narrow mass-free spaces are retained in the mold for allowing steam to escape or exit during the thermal drying and forming process where the molding mass is at a higher density as compared to the molded article.

Examples of such approaches include the publications WO 2005/021633 by E. Helou et al., and WO 2010/118249 A1 by E. Helsel et al. This current art teaches primarily medium, long or ultralong fibers for the molding masses. In addition, this current art teaches wax emulsions and organic or inorganic crosslinking ingredients at levels up to 20%. This current art teaches that the high fiber composition enables the deposition of the molding mass into a target mold including mass-free gaps for steam escape or exit without any extrusion vents in the mold. The molding mass material is held in the mold by the fibers.

Other current art teaches compositions dominated by a high percentage of inorganic material powders as fillers. The compositions contain a much lower percentage of fibers and starchy flour components. The starchy flour components connect and/or glue the wet preforms into a stable matrix.

Examples of such approaches include publications WO 9419172 A1, WO 9412328 A1, WO 9605254 A1, WO 9612606 A1, and WO 9723333 A1, and U.S. Pat. No. 5,705,239 by Per Andersen and Simon Hodson. This current art teaches substantially the molding including pressing of inorganic compositions into articles.

Still other current art teaches molded articles based on the sheet or cone wafer manufacturing principles. Ungelatinized starchy flours are the dominant component of the molding mass. The molds include dedicated openings for both material and steam escape or exit. The molding chambers hold enough material for a substantially complete fill and for the extrusion of a small amount of material during the initial steaming and foaming phase. During the initial steaming and foaming phase, a porous lightweight article initially forms. After further drying time, a demolding is conducted. The matrix of the molded article includes predominantly gelatinized starchy flour. The articles are optionally strengthened with addition of other materials such as, for example, a minor percentage of fibers or fillers.

Examples of this current art include publication U.S. Pat. No. 5,376,320 by Tiefenbacher et al. This current art teaches manufacturing of thin walled compostable shaped bodies which are manufactured from substantially fat free fluid starch batters according to the wafer baking principles. The main ingredients include starch and water. This current art teaches the additional application of a relatively small percentage of metal salts of fatty acids and other release agents for mold release.

Further current art teaches the application of hydrocolloids together with starchy flours, fibrous materials of undefined sizes, fiber lengths and fiber thicknesses, and mineral fillers for the manufacturing biodegradable articles. Examples of this current art includes publication CA 2654771 by Donald W. Renn, US 2007/0292643 A1 and US 2009/0263601 A1, and U.S. Pat. Nos. 7,618,485 and 7,700,172. This current art teaches the selection of hydrocolloids for stabilization of the articles after a heating phase. This current art further teaches that a high ratio of water is required for the formation of the hydrocolloids into the moldable mass. Thus, this current art lacks a technically viable and relatively fast process for production of final dry articles consistent with industrial mass manufacturing. Further, this current art's teaching of the addition of foaming aids, such as surfactants, can be problematic because the foaming aids facilitates rapid moisture transfer into the molded articles, and moisture content above certain percentages softens and destabilizes the structure of the molded article. Thus, coating with any of the current art's water-based coating materials can result in serious deformation of the articles. In addition, such coatings can fail in the presence of hot liquids, where high temperatures increase moisture transfer into the articles.

Figure 2:
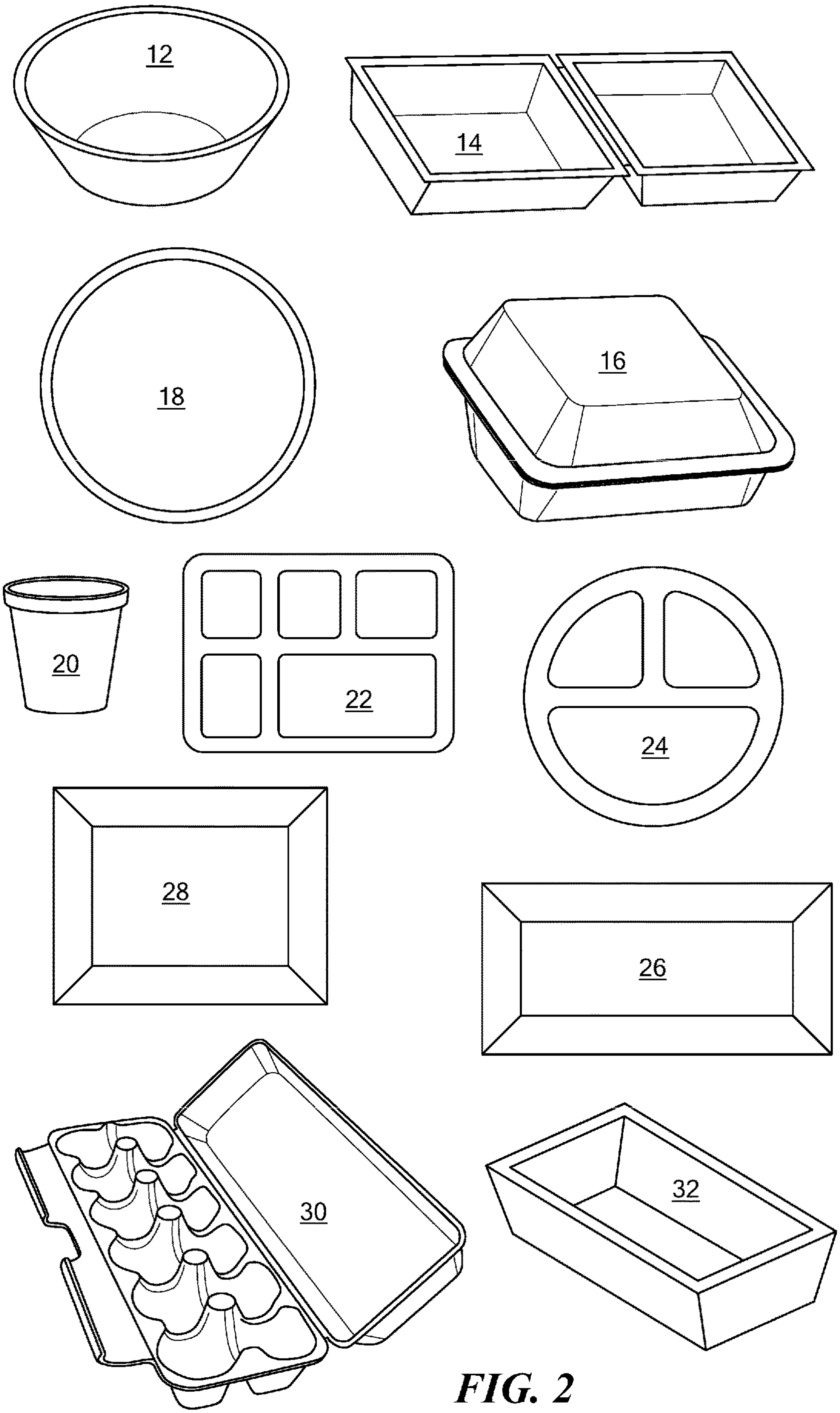
FIG. 2 shows perspective and top plan views of molded articles according to non-limiting embodiments of the invention.
Figure 3:
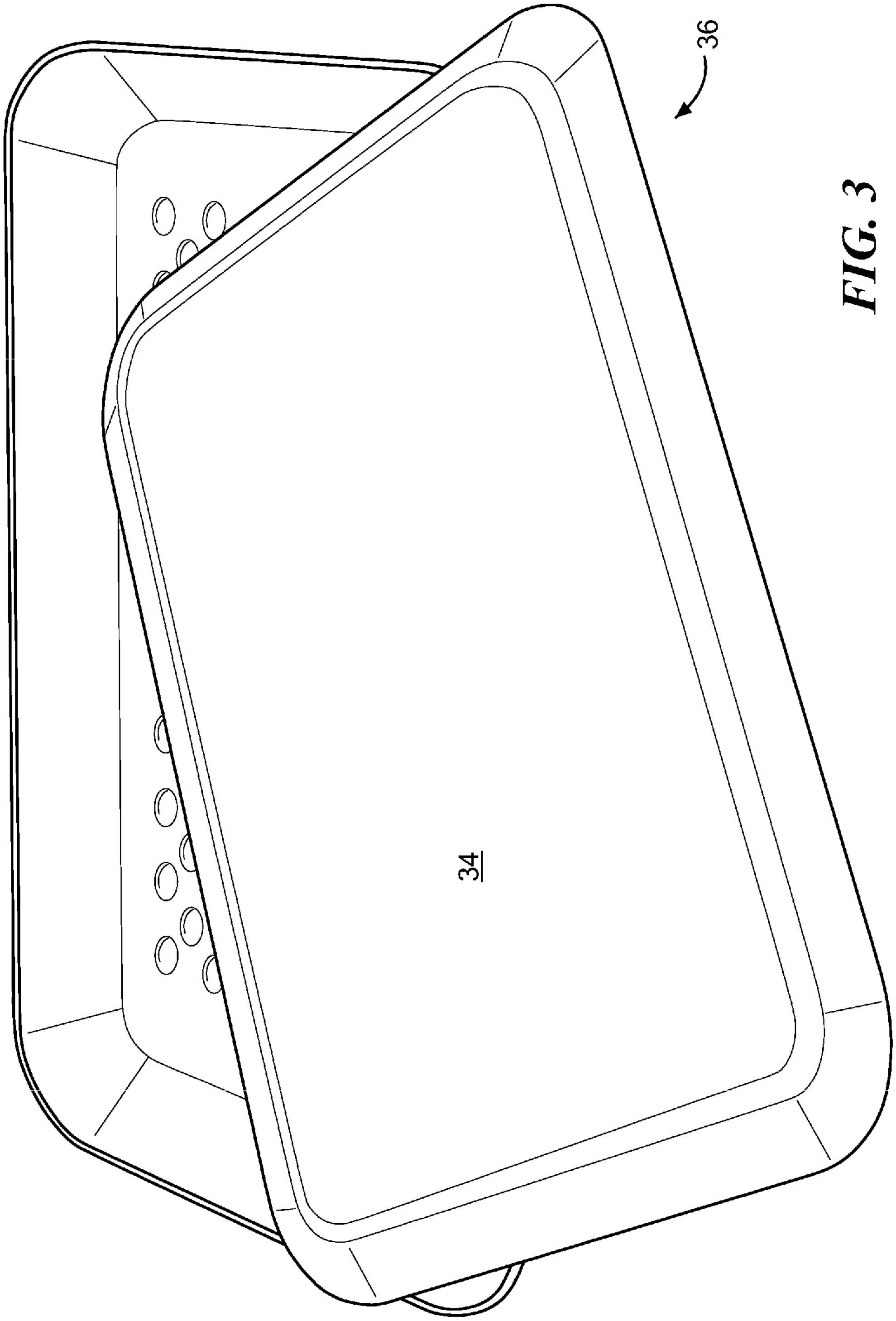
FIG. 3 shows a perspective view of a bottom of a molded article including a tray according to an exemplary embodiment of the invention.

The present invention features biodegradable and compostable molding mass compositions, molding masses, and molded and finished articles including, for non-limiting embodiments, molded trays, as shown in the perspective views of molded trays (2, 4, 6, 8 and 10) in FIG. 1. Referring to FIG. 2, the inventive molded and finished biodegradable and compostable articles include different types of containers having different sizes and shapes, such as, for non-limiting embodiments, a bowl (12), a clamshell as shown in open (14) and closed (16) configurations, a plate (18), a cup (20), trays for meals (22, 24) and/or or other goods (26), a meat tray (28), an egg tray (30), a baking pan (32), and other disposable containers known in the art for relatively short term containment of goods. FIG. 3 shows a perspective view of the bottom (34) of a molded tray (36) according to a non-limiting exemplary embodiment of the invention.

The inventive articles include homogeneous molded and finished articles of relatively high smoothness, stability and flexibility. The invention also features methods for the manufacture of the inventive biodegradable and compostable molded and finished articles.

Figure 4:
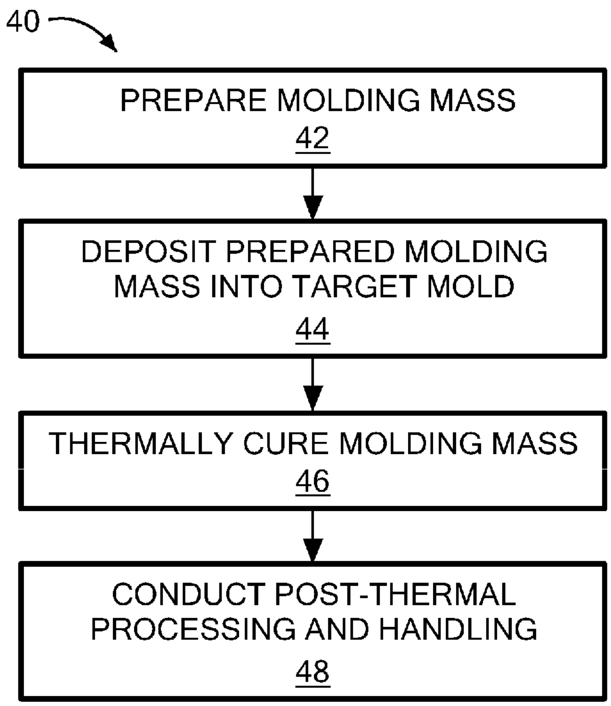
FIG. 4 is a block diagram showing steps of a method for making a molded article according to an exemplary non-limiting embodiment of the invention.
Figure 5:
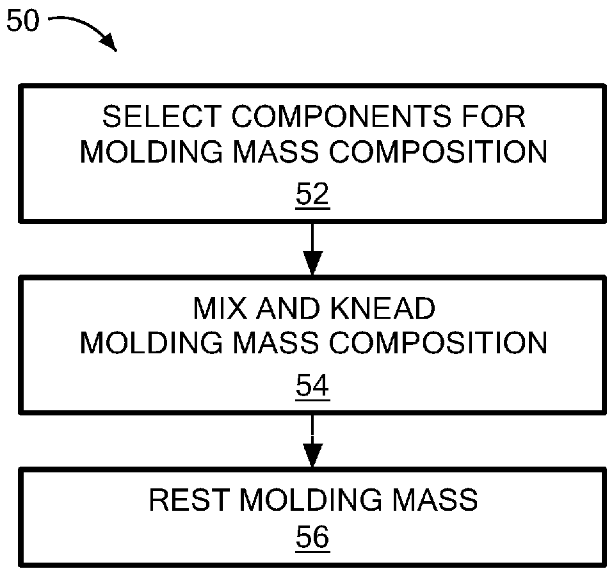
FIG. 5 is a block diagram showing steps of a method for preparing a molding mass according to an exemplary non-limiting embodiment of the invention.
Figure 6:
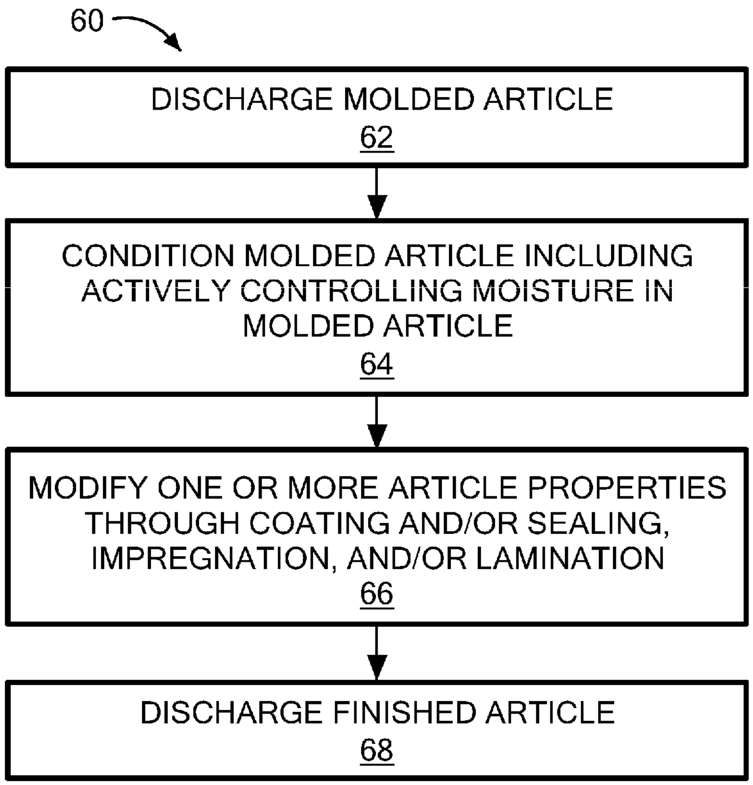
FIG. 6 is a block diagram showing steps of a method including post-thermal processing and handling steps according to an exemplary non-limiting embodiment of the invention.

The inventive manufacturing method (40) as shown in the block diagram of FIG. 4 includes steps for preparing the molding mass (42), portioning and discharging thereby depositing the prepared molding mass into a target mold (44), thermally curing the molding mass for the formation of a molded article (46), and post-thermal processing and handling steps (48). Referring to block diagram of FIG. 5, the molding mass preparation step (50) includes selecting the components for the molding mass composition (52), mixing and kneading the composition for preparation of the molding mass (54), and resting the mixed and kneaded molding mass (56) for a select time prior to deposition in the target mold. Referring to FIG. 6, the post-thermal processing and handling step (60) can include discharging the molded article from target mold (62), optionally conditioning the molded article including actively controlling the moisture in the molded article (64), optionally modifying properties of the molded article through coating and/or sealing, impregnation, and/or lamination processing (66) and discharging the finished article (68) for further handling and/or distribution as necessary. In alternative embodiments, the molded article is not discharged from the target mold prior to post-thermal processing. The manufacturing method is suitable for mass production, is cost effective in terms of manufacturing and environmental costs, and the molded and finished articles are environmentally sustainable.

The technical parameters for thermal molding including curing, post-thermal processing handling of the molded article after demolding, and additional components for the modification of stability parameters can be selected and/or varied depending on the desired end use or application for the molded finished article. Formulations for the molding mass composition according to the present invention include a set of required or indispensable ingredients or components which act in a synergistic way based on their physical and chemical properties for the desired material parameters of the molded and/or finished article and ease of in-line manufacturing. Furthermore, additional optional ingredients and/or components are discussed for modification of, for non-limiting examples, surface properties, weight, flexibility and color.

The primary ingredients or components of the molding mass composition of the present invention include a liquid component including a water component and a non-liquid soluble solid component including a starch component and a fiber component.

The liquid component including the water component is selected in an amount for enabling a first plastic-elastic texture and consistency after mixing and kneading. The first plastic-elastic texture and consistency enables relatively easy and precise portioning of the molding mass in the target mold for a rapid distribution while simultaneously avoiding the substantial formation of interstitial voids between the non-liquid soluble solid components. The liquid component hydrates the non-liquid soluble solid component. During hydration, the liquid component attaches to the non-liquid soluble solid component. Non-limiting examples of such liquid attachment include substantially covering all of the non-liquid soluble solid component with a minimum layer of the liquid component. Other non-limiting examples of hydration liquid attachment include one or more chemical interactions, hydrogen bonding reactions, and/or capillary suction interactions between the liquid component and the non-liquid soluble solid component.

The liquid attachment associated with hydration is a function of a porosity or a swelling capability of the non-liquid soluble solid component. During the liquid attachment associated with hydration, the liquid component can fill interstitial voids present in the non-liquid soluble solid component, including for non-limiting examples, interstitial voids in the non-liquid soluble components.

A molding mass having a dough-like texture and consistency results after the water component is added to and mixed with the non-liquid soluble solid component. Further kneading of the molding mass using a continuous mixer and/or batch mixer results in the molding mass having a smooth first plastic-elastic texture and consistency. The mixing and kneading steps are conducted for a select equilibration time until the molding mass has a substantially smooth, appearance, and the solid component is substantially homogeneously distributed, and the molding mass is substantially free of air filled voids.

The mixing and kneading is conducted according to mixing and kneading principles known to those of ordinary skill in the art considering, for non-limiting examples, the composition, density, viscosity, and volume of the molding mass, the type of mixing and kneading tools including for non-limiting examples, the impeller type, tank size, equipment configuration, mixing intensity and duration, and the mass load of the mixer relative to the energy introduced via the mixing tools. In non-limiting exemplary embodiments, the selected equilibration time is in a range of 5 to 50 minutes, preferably in a range of 8 to 35 minutes. After mixing and kneading, the moisture content of the molding mass will equal the moisture content of its components. A minimum time and mixing intensity is required for a substantially equal hydration of primarily the fiber components but also of the starch components of the molding mass composition. Equal hydration can be improved with an increase in temperature. The temperature of the molding mass composition can be raised by raising the temperature of one or more of the components of the molding mass composition and/or through the incorporation of energy transmitted via the mixing and kneading tools. The temperature of molding mass composition must not exceed 45° C. and preferably no exceed 40° C. to avoid any premature gelatinization of the starch components in the molding mass composition.

The liquid component can include soluble and/or emulsified components and/or additives in addition to the water component. The water component can substantially and disperse homogenously any dissolve any soluble emulsified components. Thus, the amount of the water component is selected for any required dissolution and/or dispersion for regulating or enabling a soft molding mass having a first plastic-elastic texture and consistency after select mixing and kneading.

In a preferred embodiment, the total liquid content in the molding mass composition, including the added water component, and moisture content of the starch and fiber ingredients or components, and/or the liquid content of any other soluble and/or emulsified components is in a range of 57% to 65 wt. %, and preferably in range of 57.8 to 64.9 wt. %, and more preferably in a range of 59 to 64 wt. % and most preferably in a range of 59.3 to 63.4 wt. % relative to or based upon a total mass of the molding mass composition.

The starch component of the molding mass composition includes a starch selected from a native starch, a chemically modified native starch, a physically modified native starch, a genetically modified native starch, and a combination of at least two of the afore-mentioned starches. The starch component can include a starch having a form of a powder and/or a flour, also known as a starchy flour, which is made up of a plurality of starch granules. In a non-limiting embodiment, the starch granules can be derived from a milled or ground starch source, such as, for a non-limiting example, a wheat source and/or a corn source.

The native starch component is based on a source plant or a part of a source plant which has a starch content which is relatively high in comparison with other plants or other parts of the respective source plant. Non-limiting examples of native source plants include wheat, corn, rice, pea, potato, and cassava. Non-limiting examples of native source plant parts include tubers, roots, seeds and/or fruits. Table 1 below indicates typical starch content of non-limiting examples of native starch plants for use in the present invention.

TABLE 1

Plant Starches

| Plant | Starch Content (Net Starch Percentage) |
|---|---|
| Potato | 80 |
| Corn | 79 |
| Rice | 76 |
| Cassava | 74 |
| Wheat | 72 |

CULTIVATED PLANTS, PRIMARILY AS FOOD SOURCES-Vol. I—Starch Bearing Crops as Food Sources-Krisztina. R. Végh, © Encyclopedia of Life Support Systems (EOLSS), STARCH BEARING CROPS AS FOOD SOURCES, 2011; G. Fuleky (Ed.) Cultivated plants, primarily as food sources, EOLSS publishers, 2009, pp. 253-287: K. R. Végh Starch bearing crops as food sources Thus, the starch component in the inventive molding mass composition can consist of a wheat starch, a corn starch, rice starch, a pea starch, a potato starch, a tapioca-type cassava starch, and two or more of the afore-mentioned starches. Starch, a polymer of glucose, can be found in most plants organized in 1-140 μm granules. The following table lists various starch types which can be used in the starch component of the molding mass composition of the current invention. The technology or the manufacturing of starch processing prior to its use in the present invention differs according to the raw material on which the starch is based.

TABLE 2

Technological Parameters of Food Starches
Data: Technology of Wafers and Waffles, 2017

| Starch type | Gelatinization Range ° C. | Amylose % | Granule Diameter size range μm | Granule Diameter Av. size μm |
|---|---|---|---|---|
| Arrowroot | 68-81 | 21 | 9-40 | 23 |
| Barley | 56-62 | 22-29 | 2-10, 10-30 | 6/19 |
| Corn | 62-70 | 28 | 5-25 | 14 |
| Corn, high amylose | 67-87 | 70 | 4-20 | 10 |
| Potato | 58-66 | 20 | 10-100 | 36 |
| Potato, sweet | 58-75 | 18 | 4-40 | 19 |
| Rice | 61-78 | 14-32 | 3-8 | 5.5 |

TABLE 2-continued

Technological Parameters of Food Starches
Data: Technology of Wafers and Waffles, 2017

| Starch type | Gelatinization Range ° C. | Amylose % | Granule Diameter size range μm | Granule Diameter Av. size μm |
|---|---|---|---|---|
| Rice, waxy | 55-65 | $<1$ | 2-15 | 6 |
| Sago | 60-77 | 26 | 15-50 | 33 |
| Tapioca | 52-64 | 17 | 5-35 | 14 |
| Wheat | 53-65 | 26 | 2-38 | 6.5/19.5 |

In a preferred embodiment, the molding mass composition includes a starch component including a native potato starch. In a more preferred embodiment, the molding mass composition includes a starch component including a native potato starch in an amount of at least 50 wt. % based on a total mass of the solid component.

In a preferred embodiment, the starch component includes a moisture content characteristic of the native starch making up the starch component. For non-limiting examples, a starch component including a potato starch has moisture content in a range of 18% to 21 wt. % based on the total mass of the starch component. In another non-limiting example, a starch component including a corn starch has a moisture content in a range of 10 to 15 wt. % based on the total mass of the starch component.

In an embodiment, the starch component has a gelatinization temperature in a range of 50° C. to 70° C., and preferably a range of 52° C. to 66° C.

The starch component can be prepared using processes known to those in the ordinary skill of the art including, for non-limiting examples, milling, extraction, drying and/or grinding processes. The starch component can include a plurality of starch granules having a sizing dispersion in a range of 1 to 120 μm and preferably in a range of 2-100 μm.

The starch component can include a starch which provides a relatively high viscosity increase during a gelatinization such as, for non-limiting examples, a potato-based starch, a tapioca-based starch, and/or a starch having a degree of cross linking. The preferred viscosity increase of either the native or crosslinked starches during gelatinization is equal or greater than comparable to the viscosity increase of a tapioca-type cassava starch. Preferred cross-linking utilizes bi- or multifunctional reagents to induce the formation of intramolecular and/or intermolecular cross-links between adjacent starch chains within the starch granules. Starch cross-linking reactions can strengthen the structure of swollen granules upon gelatinization, imparting resistance to viscosity breakdown. Preferred cross-linked starches possess one cross-link for every 100-3000 glucosyl units. Relatively low levels of cross-linking stabilize the granule structure, allowing for a higher granule swelling during heating and higher paste peak viscosities are observed. Although progressively higher levels of cross-linking are possible, they are generally not preferred in the present invention because the higher cross-linking levels lead to reduced granule swelling.

The chemically modified native starch can include, for non-limiting examples, an esterified starch, an etherified starch, a dialdehyde starch, an ionic starch, high amylose starch, a high amylopectin starch, a waxy starch having approximately 100 wt. % amylopectin, and a combination of two or more of the afore-mentioned chemically modified starches. The degree of substitution (DS) of chemically modified starches for use in the present invention is in a range of 0.005 to 0.2, and preferably in a range of 0.02 to 0.18. The chemically modified starch including amylopectin for use in the present invention includes amylopectin in a range of 70 wt. % to 99 wt. % and preferably in a range of 75 wt. % to 99 wt. %. Based on the total mass of starch component.

The physically modified starch component can include, for non-limiting examples, a pregelatinized starch, a dextrin, an extruded starch, a pre-cooked starch, and a re-dried starch. A pre-gelatinized starch will substantially fail to gelatinize and/or swell with liquid when heated in the presence of moisture.

In a preferred embodiment, the starch component includes a pre-gelatinized starch. It is observed that a pre-gelatinized starch in the starch component results in improved surface quality, stability, and absence of voids in the molded and/or finished article. It is hypothesized that the water binding and/or swelling properties of the pre-gelatinized starch immobilizes water which then is advantageously available for gelatinizing a non-pre-gelatinized starch component more efficiently during thermal processing including a hot molding step. The swollen pre-gelatinized starch moreover contributes to a more elastic and cohesive molding mass which in turn assists in the distribution of the molding mass substantially evenly throughout the mold while simultaneously limiting or avoiding the occurrence of voids during the molding mass deposition process.

In alternative embodiments, the starch component includes a pre-gelatinized starch in a range of 0 to 30 wt. %, preferably in a range of 2 wt. % to 26 wt. %, more preferably in a range of 4 wt. % to 26 wt. %, and most preferably in a range of 5 wt. % to 22 wt. %. based on the total mass of starch component.

The fiber component includes a plurality of fibers. The fibers can be selected from a group consisting of fibers from a non-genetically modified plant source, fibers from a genetically modified plant source, synthetic fibers, and a combination of the afore-mentioned fibers. The synthetic fibers can include fibers derived from carbon-based materials. The plurality of fibers can include a plurality of cellulosic fibers. The cellulosic fibers can include fibers selected from a wood, a shrub and a grass. The cellulosic fibers can include fibers based on wood, cotton, hemp, jute, flax, bamboo, ramie, sisal, bagasse, banana, cereal straws, fibrous plants, and a combination of at least two of the afore-mentioned cellulosic fibers.

In other embodiments, the fiber component can include fibers including natural fibrous materials, refined natural fibrous materials, processed natural fibrous materials, synthetic fibrous materials, genetically modified fibrous materials, and a combination of the afore-mentioned fibers. The fibers of the fiber component of the invention can include natural, refined and/or processed natural fibrous materials including lignin, hemicelluloses or other by-products. For other non-limiting examples, the fiber component can include natural, refined and/or processed fibrous materials including brans and/or materials from cereals, legumes and other seeds. In other non-limiting examples, the fiber component of the present invention can include fibrous materials including refined, processed, and/or synthetic fibrous materials, including fibers generated or regenerated from natural cellulose, carbon fibers, polylactide-based fibers, polyhydroxyalkanoate-based fibers and/or other synthetic fibers.

In contrast to the current art which teaches biodegradable articles including a combination of short, medium and long sized fibers for an alleged fiber reinforcement effect, as discussed in, for a non-limiting example, the prior referenced publications of E. Helou, the fiber component of present invention includes plurality of fibers each having a length in a range of about 1 to 250, and preferably in a range of about 2 to 100 times, and most preferably in a range of about 2 to 40 times the diameter of a starch granule included in the plurality of starch granules in the starch component of the present invention. The select ratio of fiber length to starch granule diameter enables fiber embedding thus strengthening the matrix of the molded and/or finished article.

In a non-limiting example, assuming a starch granule having a diameter of 10 microns, then the fiber component includes a plurality of fibers each having a length in a range of about 10 to 2500 microns, and preferably in a range of about 20 to 1000 microns, and most preferably in a range of about 20 to 400 microns.

The current art teaches a combination of long, medium-sized and short fibers is best for a fiber reinforcement effect including flexural, impact, and tensile strength. See for a non-limiting example, publication WO 2005/021633 which defines long to very long fibers having respective lengths in a range of 4 to 25 mm, medium-length fibers having respective lengths in a range of with 0.5 to 5 mm and short fibers having respective lengths in a range of smaller or less than 0.5 mm.

It has been found surprisingly that the use of very long, long or even medium-sized fibers results, as defined in the current art, produces a less favorable matrix for the molded and/or finished article. It is presumed or hypothesized that the embedding of the bigger or longer fibers within the article matrix results in a less homogeneous structure. In addition, the longer the fibers, the greater the opportunity for blocking at the extrusion holes of the molds. Embedding of long fibers in the matrix around the extrusion holes increases the risk of frayed article edges during the demolding step. The selection of shorter fiber lengths in the present invention minimizes the risk of fraying at the article edges during demolding.

The percentage of fibers included in the fiber component is selected or varied according to the flexural, impact, and tensile strength desired for the article structural matrix. The amount of the starch component is selected for a desired internal cohesion and surface quality where it is presumed that the starch component connects, glues, and/or embeds at least partially the fibers of the fiber component and any optional filler component in the molding composition.

The present invention features a molding mass composition including a starch/fiber wt. % ratio in a range of 94 wt. % starch:6 wt. % fiber to 49 wt. % starch:51 wt. % fiber, and preferably a range of from 88 wt. % starch:12 wt. % fiber to 55 wt. % starch:45 wt. % fiber, and more preferably a range of 83:17 to 57:43.

The fibers of the fiber component can be selected for their fiber properties including, for non-limiting examples, high tensile strength, high flexibility, improved embedding characteristics, and/or other specific fiber properties selected according to the desired characteristics of the molded and/or finished article. The quantity or percentage of a particular group of fibers having a particular property or characteristic can be selected in order to modify, i.e., increase or decrease, enhance or minimize, the corresponding trait, such as, for non-limiting examples, the flexibility, rigidity, and/or impact strength, of the molded and/or finished article.

The selected weight percent ratio of starch component to fiber component enables a synergistic action of the two components for a more homogeneous molding mass and an improved embedding of the fibers. Improved and/or increased molding mass homogeneity and fiber embedding contributes to the improved structural stability of the molded and/or finished article.

In a non-limiting example, the selection of fibers or a group of fibers having the property of relatively shorter fiber lengths in the fiber component can result in an easier packing or more homogeneous assembly of the starch granules in the molding mass and ultimately in the molded and/or finished article.

In addition to the water and solid components including the starch and fiber components, the molding mass composition can include the following additional optional ingredients or components.

The current art teaches compositions including natural proteins or other natural latexes. Non-limiting examples of proteins or latexes applied in the current art include wheat proteins (gluten), corn proteins (zein), animal-based gelatins, or rubber latexes. In the present invention, it is preferable not to add natural proteins or any natural latexes to the molding mass composition, however, because such proteins or natural latexes can interfere with the thermal processing of molding mass causing for non-limiting examples, mold residues.

The current art teaches the use of mold release agents, but the mold release agents of the current art each have their drawbacks or limitations. For example, the current art teaches mold release agents including fats and/or oils derived from animal or vegetable sources in the manufacturing of edible cone or sheet wafers. Such mold release agents have an inherent thermal instability. The use of such mold release agents can lead to the formation of mold residues. Such mold residues disadvantageously require periodic cleaning and/or removal from the mold. Mold residues can otherwise build up and result in a less smooth mold surface, which correspondingly reduces the smoothness of the surfaces of the molded articles formed with the mold.

The current art also teaches mold release agents including hard fats including fully hydrogenated oils or other fats in the manufacturing of biodegradable articles. The current art teaches such mold release agents typically in the forms of flakes, powders or emulsions in water including various emulsifiers. Emulsifiers increase moisture absorption which increases the softness and/or flexibility of the molded article while reducing its impact strength.

The current art also teaches mold release agents including waxes. In water-based molding masses, homogeneous distribution of wax-based mold release agents can require emulsification, fluid waxes, and/or wax powders for emulsification. Emulsifiers increase moisture absorption, as discussed above. Molding masses including wax release agents in a dosage of a few wt. % of the total molding mass will not provide any moisture repellence to the molded article. Molding masses including wax release agents in a dosage higher than even a few wt. % of the total molding mass can add slippage to the molding mass during distribution in the hot mold and can interfere with the molding process. A shiny surface from wax surplus develops on a surface of the molding mass as the dosage of wax is increased beyond a few wt. % of the total molding mass. The shiny surface can cause material slippage, the over or excessive extrusion of material through extrusion vents, and ultimately can result in holes in the areas of articles formed close to the extrusion vents. Current art teaches mold release agents including wax emulsions based on natural sources, but the additional emulsifiers required again compromise the moisture stability of the molded articles. The current art teaches mold release agents including fats, oils and/or waxes provide moisture protection to the molded and/or finished article because these agents are hydrophobic. Such teaching fundamentally fails to understand the dynamics of mixtures of hydrophilic materials such as starchy flours and fibers. The mixture of hydrophilic materials such as gelatinized starches and embedded fibers with strongly hydrophobic fats or waxes leads to phase separation. In addition, the percentage of the hydrophobic phase must be low relative to the total molding mass in a hot molding operation. Otherwise, material slippage, steam escape disturbances and other operational issues can occur thereby preventing a superior molding process. A low hydrophobic phase percentage will not impart any substantial moisture protection to the molded article. Further, any moisture diffusion or absorption will transfer via the hydrophilic main phase and circumvent the small hydrophobic areas easily. The high percentage of hydrophilic fiber and starch material enables moisture transfer to the molded article. Moreover, any emulsifiers added to wax mold release agents will further increase moisture transfer to the molded article. The moisture transfer reduces the impact strength of the molded article, as discussed above.

The current art also teaches mold release agents including emulsifiers including monoglycerides, or diglycerides of fatty acids, citric acid esters of fatty acids, lecithin, and/or other emulsifiers with a hydrophilic-lipophilic balance or HLB value which is oriented towards the lipophilic side, that is from zero to about 7. Current art teaches lecithin applied in wafer recipes results in mold soiling issues. The ability of emulsifiers to mediate moisture diffusion and moisture transfer is negative for moisture sensitive articles as discussed above.

Current art teaches mold release agents including inorganic powders such as talcum and similar silicates. Such agents slowly build up forming residues which stick to the surface of the mold mediated by some of the gelatinized starch. There are potential safety issues due to a suspected cancer risk potential associated with talcum. Current art also teaches other inorganic powder mold release agents include metal oxides and carbonates such as magnesium oxides and hydroxide carbonates, which can be applied in wafer recipes, but also result in mold soiling issues. Current art further teaches mold release agents including metal stearates such magnesium stearate in the manufacturing biodegradable articles based on starches, fibers and similar materials. The preferred mold release agents in such applications include stearates from zinc, calcium, or aluminum. Over time, mold residues develop and require periodic cleaning and/or removal from the surface of the mold. The reaction of the metal counter ions with the mold surface at high molding temperatures during multiple molding cycles remains critical for continuous industrial manufacturing. The metal counter ions can intercalate to the cast iron and modify the metal composition of the mold at the mold surface, and/or can link to a charged group of the molding mass thereby building up mold residues within a relatively short number of molding cycles. Such molds are then characterized by a hazy white-like surface.

In contrast to the current art, the present invention features a specific release agent for continuous thermal molding processing including hot molding, i.e., at temperatures of 190° C. or higher. The mold release agents of the present invention provide excellent release without the formation of mold residues. The mold release agents of the present invention include saturated long chain fatty acids, and preferably, saturated long chain fatty acids having a carbon chain length of 12 carbons or higher, including, for example, lauric acid, myristic acid, palmitic acid, stearic acid, or arachidic acid and similar 12+C long chain fatty acids. In a preferred embodiment, the mold release agent includes a pure saturated long chain fatty acid. In another preferred embodiment, the saturated long chain fatty acid mold release agent has a form of a powder. The powder can integrate easily into the molding mass. Preferably the saturated long chain fatty acid mold release agent powder includes particles each having a mesh size of less than 80 mesh and more preferably less than 100 mesh, the latter corresponding to a granule nominal diameter of 149 μm.

In the present invention, any potential mold residues due to the inventive release agents are removed through flashing at the high molding temperature based on their flash point and equilibrium steam pressure. Due to the volatilization of the saturated long chain fatty acids of the mold release agent at 90 to 100° C., the molds remain substantially clean even in case of over dosage. Risks of sticking and/or mold residue accumulation are thus avoided. Avoidance of mold residue build-up in continuous operation is particularly advantageous because it avoids tedious, production line stoppages and related cleaning procedures characteristic of the current art.

The present invention features a molding mass composition including the saturated long chain fatty acid mold release agent in a range of 0.1 to 2.4 wt. %, preferably in a range of 0.1 to 1.4 wt. %, and more preferably in a range of 0.1 to 1.0 wt. % based on the total weight of solid ingredients in the molding mass composition. In a preferred embodiment, the molding mass composition includes the saturated long chain fatty acid mold release agent including an acid selected from the group consisting of a palmitic acid, a stearic acid and arachidic acid.

The preferred saturated long chain fatty acid mold release agent is in a powder form for easy application, undergoes a substantially complete melting in the molding process, and any mold residues due to the mold release agent are removed through flashing during hot molding unlike the current art mold release agent residues which remain on the hot mold surface after steam release and/or demolding. The long chain fatty acid mold release agent of the invention can be used in other kinds of hot molding or hot baking applications and is not limited to hot molding operations.

In contrast to the current art, after flashing, mold residues including for example, metal oxides or polymerized lipids do not remain. In contrast to the current art's use of metal stearates, higher dosages do not result in accumulation of whitish mold residues. In contrast to the current art, the application or addition of saturated long chain fatty acid powders to the molding mass composition does not require any emulsifier for distribution and thus avoids the negative moisture sorption effects mediated by emulsifiers used in the current art.

Further, in contrast with many mold release agents taught in the current art, there is substantially no change in mold surface slippage even in situations when the long chain fatty acid mold release agent of the present invention is overdosed in an amount of more than 2.4 wt. % and up to a maximum of 10 wt. % based on the total weight of non-liquid soluble solid ingredients in the molding mass composition.

The lack of mold surface slippage enables continuous repeatable industrial manufacturing. In contrast, the mold surface slippage of the current art changes the surface properties and character of the molded articles quickly and dramatically thereby rendering the use of the related current art mold release agents non-suitable for continuous, repeatable industrial manufacturing.

Select dosing of the long chain fatty acid mold release agents of the present invention is preferred, however, as dosing is costly, and can increase the steam fuming during the thermal processing unnecessarily.

In an embodiment, the molding mass composition of the present invention includes a texturizer. The texturizer can include a reactive or a nonreactive inorganic additive, as known to those of ordinary skill in the art. Non-limiting examples of texturizers which can be used in the present invention include a gypsum, a calcium carbonate, a magnesium carbonate, a silicate, a titanium oxide, a clay additive, and a combination of the afore-mentioned texturizers. A texturizer including talcum additive at a low level is an option but not preferred where there are potential safety issues due to a suspected cancer risk potential associated with talcum, as discussed above.

In alternative embodiments, the molding mass composition includes a texturizer including an inorganic additive in a range of 0 to 16.5 wt. %, preferably 0 to 12.5 wt. %, more preferably 0 to 10 wt. %, based on a total mass of the solid component.

The molding mass does not require and thus the molding mass composition does not include a gas releasing agent at molding processing conditions including for non-limiting examples a hydrogen carbonate, or other gas releasing carbonate, or other gas releasing agent. The optional texturizers including calcium carbonate and magnesium carbonate discussed above as optional texturizers are non-gas releasing carbonates due to their stability at molding processing conditions.

In an embodiment, the molding mass composition includes a sizing agent. The sizing agent can be selected from the group of sizing agents consisting of a rosin-based sizing agent, an alkyl ketene dimer-based sizing agent, and a combination of the afore-mentioned sizing agents. The use of a select sizing agent can result in an improved internal cohesion of article structural matrix. Thus, article stability in cases of moisture exposure or access is improved.

In a preferred embodiment, the molding mass composition includes a sizing agent including a rosin-based sizing agent having a concentration in a range of 0.15 to 0.3 wt. % based on a total mass of the non-liquid soluble components of the molding mass composition.

In another preferred embodiment, the molding mass composition includes a sizing agent including an alkyl-ketene dimer-based sizing agent having a concentration in a range of 0.1 to 0.2 wt. % based on the total mass of the non-liquid soluble components of the molding mass composition.

The molding mass composition can include an additional modifier or additive for influencing directly the molding process, and/or the stability and flexibility of the molded and/or finished article.

In an embodiment, the molding mass composition includes a plasticizer in addition to the water component, that is, substantially a second or non-water plasticizer. In a preferred embodiment the second plasticizer includes urea. Urea can act differently from the water component. It is presumed that urea facilitates at least some movement of the chains of the starch component, thereby reducing any cracking of the molded article. At select urea concentrations relative to the starch component, the molded and/or finished article has an improved smoothness and stability. In alternative embodiments, the molding mass composition includes a second or non-water plasticizer including a urea at a concentration preferably in a range of 0 to 6 wt. %, more preferably in a range of 0 to 4.5 wt. %, and most preferably in a range of 0 to wt. 3% wt. based on a total mass of the starch component.

In an embodiment, the molding mass composition can include a modifier including a plurality of borate ions. The addition of borate to the molding mass composition at select concentrations relative to the starch component can affect the weight and the pore structure of the molded and/or finished article. The addition of borate can also affect the gelatinization temperature of the starch component, however. Thus, the borate addition can be added in a select amount for optimizing a selected property or properties of the molded and/or finished article and for affecting the gelatinization temperature of the starch component. In alternative embodiments, the molding mass composition includes a modifier including a plurality of borate ions at a concentration preferably in a range of 0 to 2 mmol of borate per kilogram of starch component, and more preferably in a range of 0 to 0.2 mmol of borate per kilogram of starch component.

Current art teaches the use of gums including but not necessarily limited to polysaccharides from plant, animal or microbial origin, as thickeners, stabilizers, gelling agents and emulsifiers in the food and chemical industries. The gum structure determines its application and purpose due to its particular properties such as viscosity, intrinsic viscosity, stability, gelling properties, and emulsifying properties. In the manufacturing of molded articles from fluid batters, the current art teaches the use of gums for the control of batter homogeneity and for the prevention of the disintegration of the molding mass during the pre-molding stage.

In contrast to the current art, the first plastic-elastic character of the molding mass of the present invention can make the use of gums less desirable. In an embodiment of the present invention, the molding mass composition can include a modifier including a polymer, however. The selective addition of the polymer to the molding mass composition can selectively influence the texture of the molding mass, the distribution of the mass within the hot mold, the control of extrusion of the molding mass through extrusion vents, and properties of the molded article.

In an embodiment, the molding mass composition can include a modifier including a polymer including a cellulose derivative. The cellulose derivative can include at least one of a cellulose ester and a cellulose ether. The cellulose derivative can optionally contain one or more additional ionic groups. In alternative embodiments, the molding mass composition can include a modifier including a polymer selected from the group consisting of a cellulose derivative, a cellulose ester, a cellulose ether, an agar, an alginic acid, an alginate, a carrageenan, a chitosan, a curdlan, a guar, a konjac, a konjac derivative, a locust bean gum, high-ester pectin, a low-ester pectin, an amidated pectin, and a xanthan.

In an embodiment, the non-liquid soluble solid component of the molding mass composition can include a modifier including a polyvinyl alcohol. The polyvinyl alcohol has excellent film forming and adhesive properties for selective modification of the stability and flexibility of the molded and/or finished article. The molding mass composition can include a modifier including a polyvinyl alcohol at a concentration in a range of 0 to 12 wt. %, and preferably in a range of 0 to 6 wt. % based on the total mass of the non-liquid soluble solid component in the molding mass composition.

The molding mass composition can include a modifier including a coloring agent. The coloring agent can include a coloring agent selected from the group consisting of a coloring agent included in the list of Federal Food Drug and Cosmetic or FD&C coloring agents regulated by Federal Food and Drug Administration, an E numbered coloring agent regulated by the European Union, a natural coloring agent, a magnetite coloring agent, and a combination of two or more of the afore-mentioned color agents.

In an embodiment, the coloring agent can include an additive including magnetite. The magnetite can be in the form of a powder. The use of magnetite can make the molded article more suitable for an electrostatic process.

In other embodiments, the molding mass composition can include an additive including an agent subjected to a Maillard browning reaction such as, for a non-limiting example, a protein; an agent subjected to an extended Maillard browning reaction, such as most sugars and amino acids; an agent subjected to a caramelization reaction, one or more select sugars at a select sugar concentration, one or more select amino acids at a select amino acid concentration, and/or one or more select proteins at a select protein concentration. The select sugar concentration is less than 1.5 wt. % and preferably less 1 wt. % based on a total mass of the solid component of the molding mass composition. The select amino acid concentration is less than 2 wt. %, and preferably less than 1 wt. % based on a total mass of the solid component of the molding mass composition. The select protein concentration is less than 16 wt. %, and preferably less than 11 wt. % based on a total mass of the solid component of the molding mass composition.

After selection of the components including the liquid and the non-liquid soluble solid components, as described above, a molding mass can be prepared from the molding mass composition. Preparation of the molding mass includes mixing and kneading steps conducted with, for example, a mixing and kneading system. The mixing and kneading steps can be conducted in a batch-type process or in a continuous-type mixing and kneading system for the preparation of the molding mass having a first plastic-elastic texture and consistency including homogeneous incorporation of the fibers and substantially no air- or other gas-filled voids in the molding mass.

During a first step of the mixing and kneading process, the non-liquid soluble solid components are substantially evenly distributed in the liquid phase. The non-liquid soluble solid components absorb a substantial portion of the liquid phase. The composition becomes increasingly plastic. During a second step of the mixing and kneading process, the composition is kneaded for further mixing of components.

The mixing and kneading process can be conducted using procedures known to those of ordinary skill in the art. Such procedures include thorough mixing of the fibers together with the starch granules and any other non-liquid soluble solid components along with intense kneading including optional high shear mixing during or under incorporation of the liquid components including the water component and any dissolved solutes or dispersed emulsions. The mixing and kneading process can include a stepwise addition of the liquid components for homogeneous incorporation of the fibers into the molding mass. The step wise addition of the liquid components according to methods known to those of ordinary skill can facilitate an increase of the shear forces in high shear mixing and can disintegrate or break up any nesting of fibers.

The method can include a step for the substantially preventing the introduction of air or other gas into the molding mass, and/or removal of same from the molding mass. In an embodiment, the exclusion and/or removal or air or other gas includes a step of producing a vacuum in the mixing/kneading system. In a non-limiting example, the step of producing a vacuum can be accomplished with the use of a continuous mixer either during or at the end of continuous mixing and kneading process. The use of a continuous mixer can enable a precise component dosage according to weight or mass or volumetric percentages or proportions of an added component.

Automatic metering can be applied employing a batch-type, continuous-type and/or extrusion-type equipment system, for mixing, de-aerating and preparing a molding mass having the first plastic-elastic texture and consistency. Current art mixers, kneaders and/or extruders known to those of ordinary skill in the art can be used. The molding mass can then be portioned or applied to a portioning system for deposition into a target mold.

The time periods required for the mixing and kneading process depend on the type of mixer, the geometry of the respective mixing and kneading tools, the fill volume, and the rotary speed of the mixer. In non-limiting exemplary embodiment, the time period for the mixing and kneading process in in a range of 4 minutes to 16 minutes. The mixing and kneading time periods are adjusted and/or optimized for producing a relatively soft molding mass having homogeneously distributed fibers and having a first plastic-elastic texture and consistency.

After preparation of the desired molding mass having the first plastic-elastic texture and consistency, as discussed, the molding mass undergoes an optional resting period which can vary depending upon the composition and method of preparation of the molding mass. In non-limiting exemplary embodiments, the resting period includes a minimum of 15 minutes, and preferably a minimum of 10 minutes and more preferably a minimum of 5 minutes.

The components of the molding mass composition of the current invention are selected and prepared for a relatively soft molding mass having a plastic-elastic, non-fluid texture and consistency. The composition and preparation of the molding mass of the present invention has several advantages:

Inclusions of residual air carried into the molding mass mixtures are minimized by the use of the starch component including a plurality of granules, particles, particulates and/or granulates preferably having a form of a powder. The powder form of the starch component avoids inconsistent air-filled voids formed and/or transferred to the structural matrix of the molded article. Although distinctly non-fluid, the first plastic-elastic texture and consistency of the molding mass of the present invention can flow and expand to fill the mold completely. It is surprisingly found that the molding mass of the present invention can fill the respective mold relatively quickly and substantially without voids with a relatively a low percentage of extruded waste material. Thus, weight variations in portioning the molding mass in the mold is minimized thereby reducing the percentage of waste material extrusion through the extrusion vents of the mold.

The molding mass composition of the present invention is suitable for fast and hot molding at temperatures above 190° C. for maximizing output per mold. At such high molding temperatures, the potential for discoloration or coloration change(s) due to thermal browning or caramelization reactions is substantially reduced. The curing time is selected such that no internal steam pressure remains in the molding mass and what some in the art call the glass point of the matrix of the article in process is crossed. For a full operational cycle, the curing time for an article is typically within a range of 60 seconds to 155 seconds, preferably a range of 75 seconds to 140 seconds, more preferably a range of 85 seconds to 125 seconds, where the curing time is selected as a function of the composition of the molding mass and the desired target wall thickness or wall thickness range of the molded article. The curing range of 85 seconds to 125 seconds is more typical of articles having relatively thicker wall thicknesses. In contrast, the curing times for the formation of articles from the current art's fluid, batter-based molding masses is typically around two minutes or more. The maximum curing temperature is 225° C., preferably 215° C. and more preferably in a range of 190° C. to 210° C.

The molding mass of the present invention lacks substantial free water and the corresponding molded and/or finished article lacks external steam-filled voids, cracks or similar irregularities in contrast to the current art.

Once prepared and rested, as necessary, the molding mass can be portioned. The portioning step includes dividing the molding mass into select portions using a plastic-elastic material portioning system known to those of ordinary skill in the art. Non-limiting examples of portioning equipment which can be used in accordance with the present invention include a wire cutter, a bun divider, and/or a piston-based volumetric dough divider. In a preferred embodiment, the portioning equipment has the capacity of portioning the molding mass of the current invention to a precision of at a minimum of plus/minus 1 gram.

The present invention includes the step of depositing the molding mass into a mold or molds according to a select portion or portions. The select volumes deposited into the corresponding target molds are lower than the volumes of the respective target molds. A degree of steam-mediated expansion during the thermal curing process can occur depending on or as a function of the composition of the molding mass.

The portioning step can be conducted adjacent to the continuously operating molds. The molds are ready immediately after discharge of the previously molded articles and removal of any surplus material related to the action of automatic mechanical scraping devices and/or blowers. The portioned pieces of the molding mass are introduced into the molds in an ordered way by directing the portioned pieces to the center of bottom parts of the respective empty or open molds.

Figure 7:
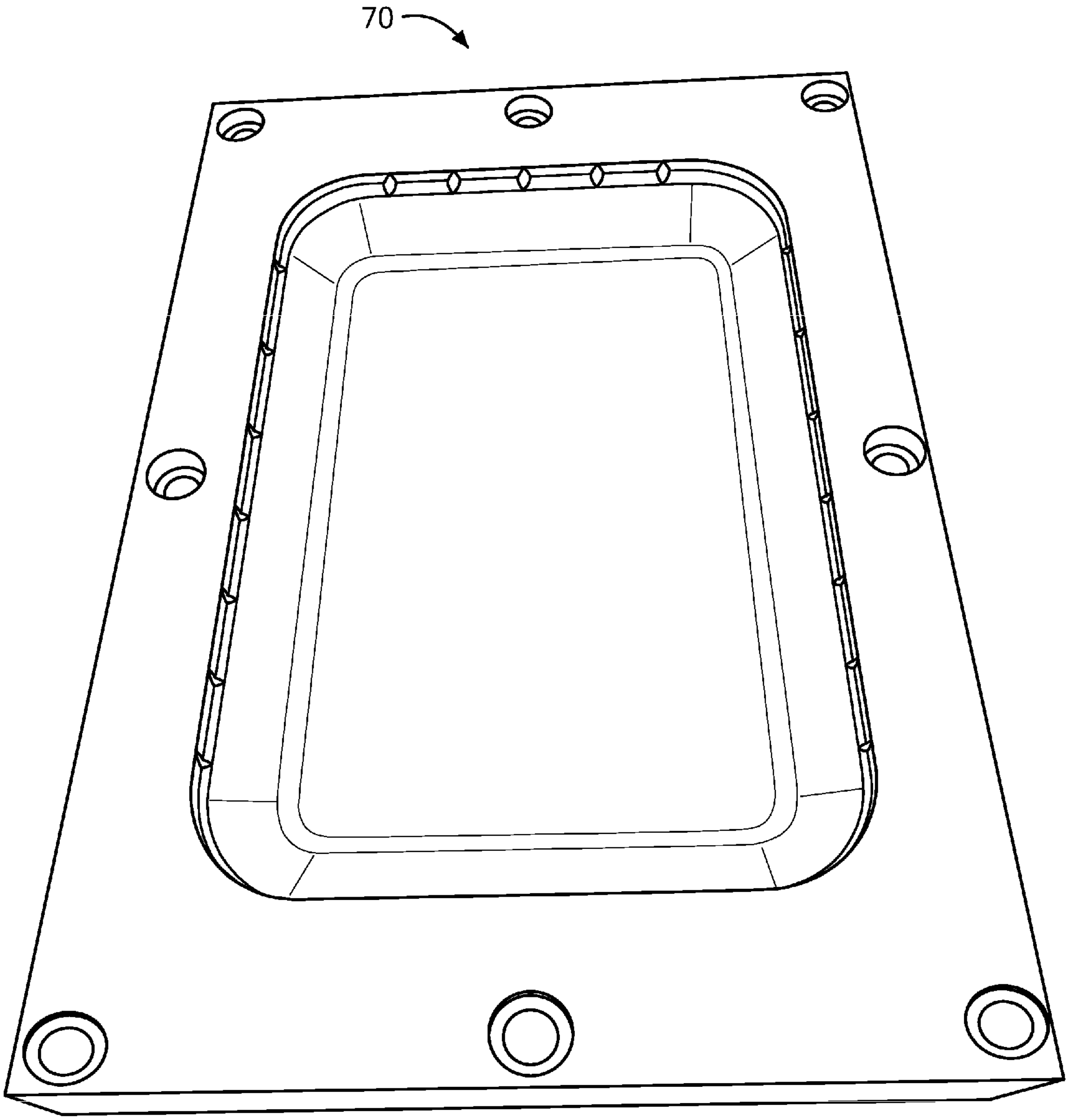
FIG. 7 shows a perspective view of an empty bottom mold part according to an exemplary embodiment of the invention.
Figure 8:
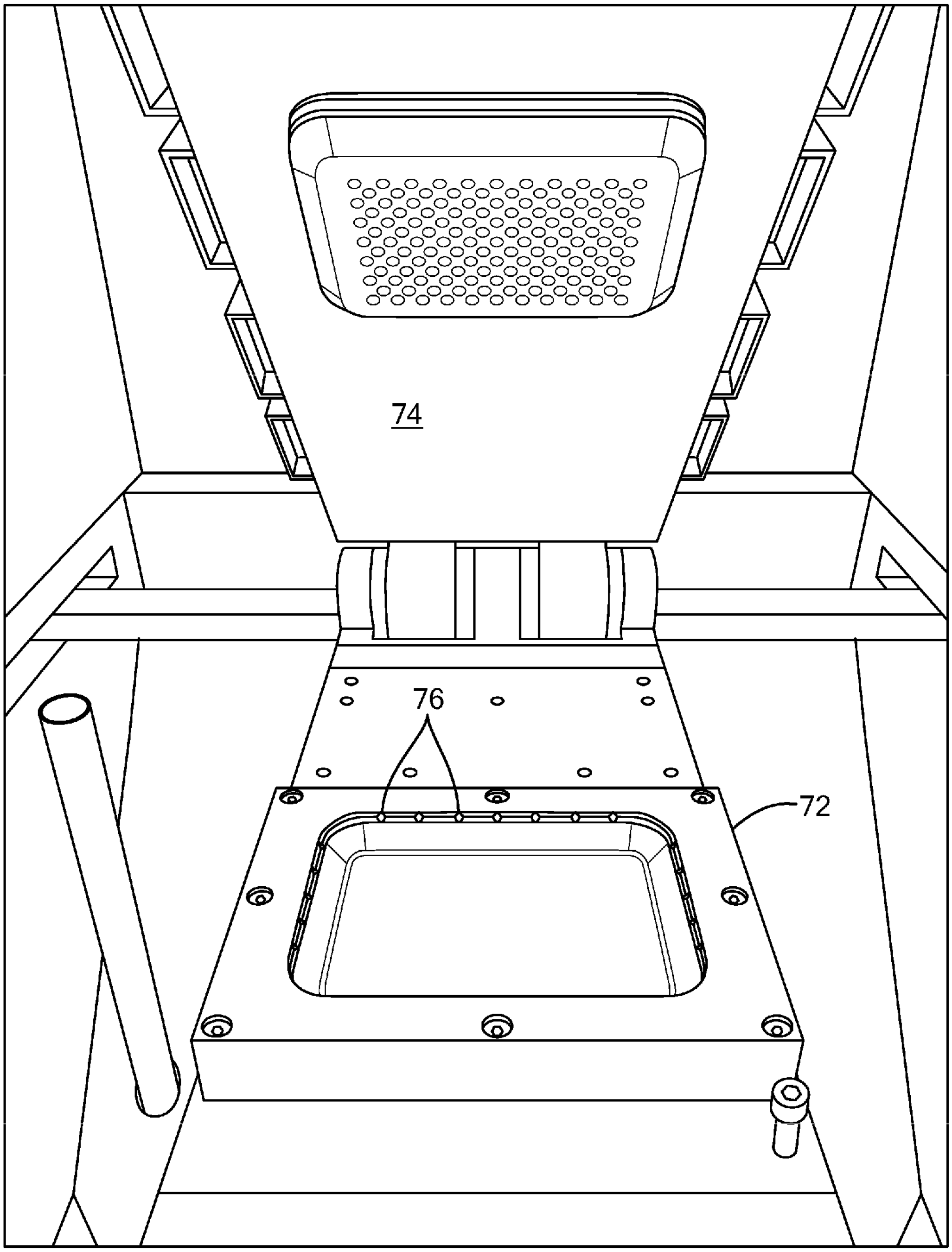
FIG. 8 shows a perspective view of an empty mold having a hinged cover according to an exemplary embodiment of the invention.

The molds within the fully automatic molding machine can be arranged within baking tongs. A non-limiting exemplary empty base part of a mold (70) is shown in FIG. 7. In an alternative non-limiting example, a target mold can be hinged at one side and locked at the opposite side immediately after deposition of the pieces of the portioned molding mass. A non-limiting example of a target mold (72) having a hinged cover (74) is shown in FIG. 8. Such an exemplary mold can be opened at, for example, a 90° angle for demolding and refilling. In an alternative, non-limiting, example, the top part of the molds is not hinged but can open horizontally. The latter non-limiting mold example is preferred for the molding of relatively non-shallow article(s). Non-shallow article(s) include items which have greater than one inch in their shortest dimension.

The molds precisely reflect the shapes of the intended or target articles. The wall thickness of the article is preferably within a range of 0.9 to 3.5 mm, more preferably with a range of 1.2 to 3.0 mm, and most preferably within a range of 1.5 to 2.8 mm. Areas of different thickness within an article are possible for forming rims, structural strengthening elements, or logos.

A mold for a hot molding process can include metal materials such as, for non-limiting examples, steel, cast iron, aluminum, brass, and a mixture of two or more of the afore-mentioned metal materials. Whole or entire molds can be made from a single metal material or different metal materials using inserts within a steel or cast-iron frame.

The rim of the mold can include an array of one or more extrusion vents or holes (76) as shown non-limiting exemplary target mold (72) shown in FIG. 8. These extrusion vents provide passage for the escape of steam and the optional extrusion of a small percentage of solid material through the extrusion vents. The extrusion vents are preferably arranged in symmetric pattern following the closing rim of molds of different parts including, for non-limiting examples, one-, two- and three-part molds. For an article having a thickness in any dimension of less than or equal to one inch, a two-part mold is preferred. For an article having a thickness in any dimension of greater than one inch, a three- or more-part mold is preferred.

Each mold can be attached to a carrying chain cycle mechanism for passing continuously the mold through a deposition phase: depositing the molding mass into the mold, closing the mold, and filling the details of the mold; a thermal curing phase: thermally curing the filled mold at the select curing temperature; a discharge phase: opening the thermally cured mold and discharging the molded article; and a clean-up phase: removing extruded solids remaining on the mold.

In the deposition phase, the molding mass is deposited into the mold and the mold is closed, as necessary. The first plastic-elastic material of the molding mass distributes substantially evenly within the mold space or enclosure. Even distribution can be enhanced by mechanical squeezing and some initial steaming. A small surplus of molding mass material can extrude or pass through the extrusion vents of the mold.

The current art teaches immediate single or multiple reopening and reclosing of the molds otherwise known as breathing operations. For example, in the manufacture of biodegradable articles or food wafers involving fluid molding masses, the current art teaches such breathing operations for rapid reduction of some moisture content to reduce the total molding time and to improve the final stability of these articles.

In contrast to the current art, such breathing operations are not mandatory in the present invention because of the excellent distribution of the molding mass first plastic-elastic texture and consistency. It is hypothesized or assumed that the portion of the select mold release agent which is disposed close to the surface of the molding mass and melts easily at the curing temperature assists in the surprisingly and unexpectedly good distribution in and substantially perfect filling of the mold by the molding mass. The capacity for good distribution in and substantially perfect filling of the target mold by the inventive molding mass thus characterizes and supports the rationale for the invention.

Figure 9:
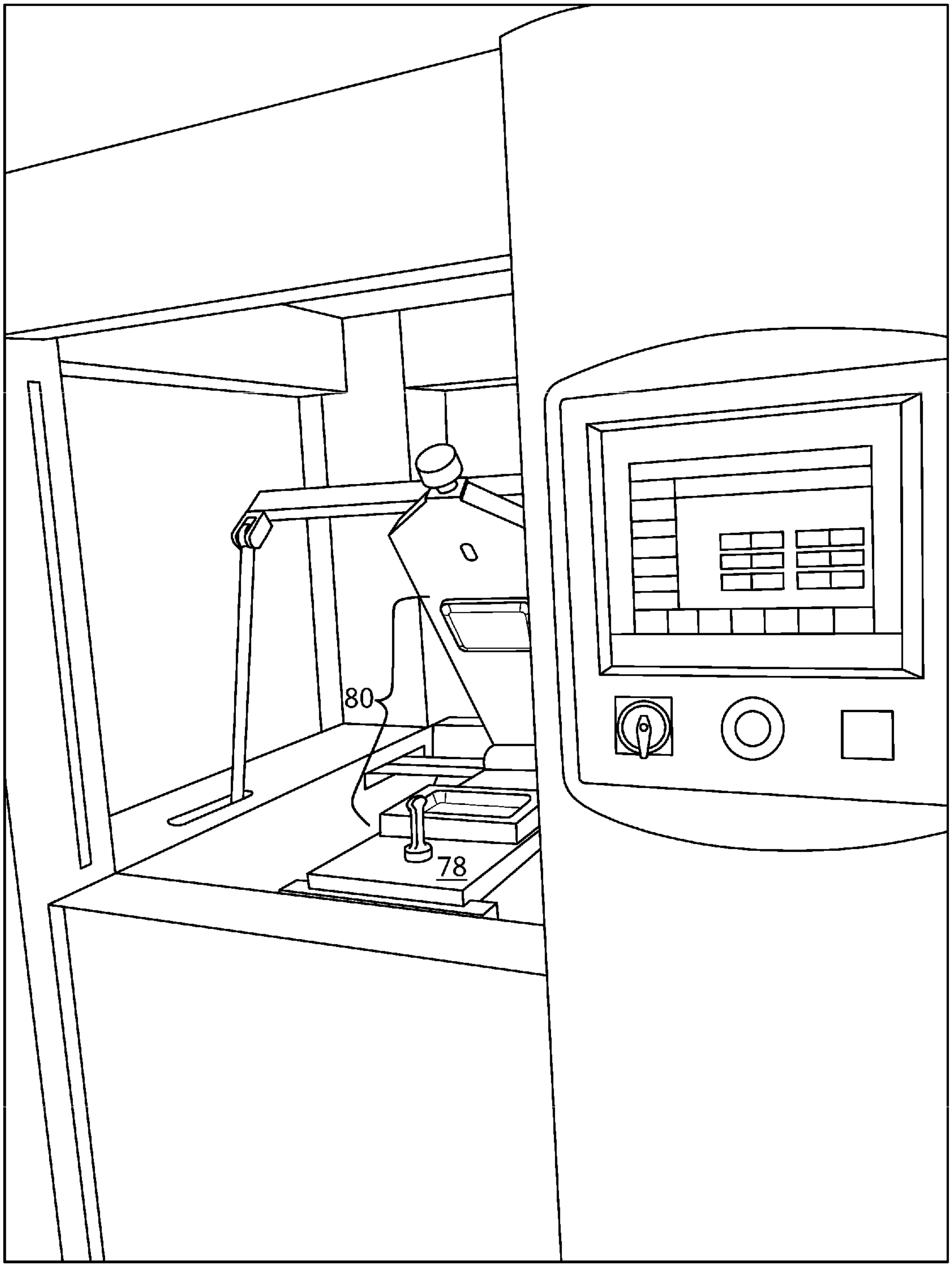
FIG. 9 shows a perspective view of a thermal curing system for conducting thermal curing of a molded mass according to an exemplary embodiment of the invention.

During the thermal curing phase, the filled mold is placed or passes into a thermal curing system and heat is applied to the mold at a select curing temperature for a select curing duration. FIG. 7 shows an exemplary empty mold (70) prior to filling with a prepared molding mass. In an alternative non-limiting embodiment, an empty mold is placed inside or passes into the thermal curing system and subsequently is filled with the prepared molding mass. FIG. 9 shows a thermal curing system (78) including an empty mold (80) disposed therein.

Heat stored in the thick metal parts of the mold transfers via the mold surface to the molding mass. The molding mass surface in direct contact with the hot surface of the mold is fixed almost immediately. There is little time if any for the formation of steam-filled voids at the molding mass surface. The moisture in the molding mass rapidly vaporizes into a foaming steam in the structural matrix of the article. The foaming steam coincides quite closely with gelatinization of any non-pregelatinized starch component. The steam transduces or passes through via the still soft internal structure of the molding mass to the extrusion holes of the mold. Some pressure builds within the mold as evidence by a hissing sound which can be heard within the first third of the curing process.

The article forms including details of the mold such as, for non-limiting examples, details such as the rim or logo of the mold. Internal steam-filled pores form substantially in a controlled distribution pattern until the gelatinization of the starch component together with the rapid loss of moisture fixes the structure into a stable internal matrix. The internal steam pores enable a more lightweight molded article.

The heating of the molding mass to temperatures around 200° C. up to a maximum of 225° C. provides a relatively fast and substantially complete or full gelatinization of the starch component, the even distribution and the quick fixation of the internal pores blown by the evolving steam, and the final hardening the structure. The present invention generally includes curing times preferably in a range of 75 seconds to 140 seconds, and more preferably in a range of 85 seconds to 125 seconds as a function of the composition of the molding mass, and the thickness or range of thicknesses of the walls of the molded article. The relatively fast curing time contributes to the efficiency of the thermal curing process and ultimately to an efficient manufacturing process. The curing times of the current art's more fluid, batter-like molding masses generally require curing times of two minutes or more, as discussed above. Any internal portions of the molded article are dried to a few percent of residual moisture. Thus, at the completion of the thermal curing phase, substantially no steam pressure remains in the structural matrix of the molded article. The structural matrix of the molded article solidifies beyond what some in the art term as the glass point of the structural matrix. In parallel with the drying and curing process, the structural matrix of the molded article shrinks which is helpful in the subsequent demolding during the article discharge phase. The thermal curing phase is continued until the molded article has a second plastic-elastic texture and consistency characterized by having a residual moisture in a range of 6 to 1 wt. %, and preferably in a range of 3.5 to 1.5 wt. % based on a total of mass of the molded article. Any over curing may result in an over-shrinkage and/or the occurrence of micro fissures or possibly visible fissures which can render the article defective. The curing stoppage point for a particular article can be selected according to principles know to those of ordinary skill in the art.

In a continuous process, the thermal curing can be conducted while the molds cycle through a heating chamber where the mold temperature is in a range of 185° C. to 225° C., and preferably in a range of 190° C. to 215° C., and more preferably in a range of 190 to 210° C. This mold temperature refers to the actual, effective temperature at the surface of the mold. The ideal thermal curing temperature is selected for maintenance of a high throughput while avoiding degradation of the organic materials including for non-limiting examples, thermal browning or even decomposition. Heat for the thermal curing process can be provided by, for non-limiting examples, gas burners, electrical induction, and other heating systems known to those of ordinary skill in the art.

The temperature differential between the mold temperature at the top and the bottom of the mold can be in a range of less than or equal to 10° C.

For a full operational cycle or thermal curing phase, the curing time of the article is generally within a range of 60 to 155 seconds, preferably within a range of 75 to 140 seconds, and more preferably within a range preferably 85 to 125 seconds, depending upon or according to the composition of the molding mass of the article and its wall thickness or thickness range. The thermal curing time is selected such that no steam pressure remains in the structural matrix of the article and said article solidifies beyond what is sometimes terms as the glass point of its structural matrix.

The method can include a hot molding the molding mass. The hot molding step includes molding inherently linked with thermal curing for in a one step process. The hot molding can be conducted within a fully automatic hot molding machine. The fully automatic hot molding machine can contain at least one, and preferably more than one single mold each having the shape or form of the target molded and/or finished article. The molded articles and/or article parts can be separated or connected together, as necessary, following the hot molding.

The discharge phase can begin when the molded article has sufficient stability or is in a sufficiently stable form and the residual moisture content of the article is in the range of 6 to 1 wt. %, and preferably in a range of 3.5 to 1.5 wt. %, more preferably in a range of 3 to 1.5 wt. % based on a total mass of the molded article. The select control of residual moisture is important for avoiding structural defects in the molded article. Structural openings in an article can result when, for a non-limiting example, blown steam remains in the internal structure of the article at percentages higher than the tolerable residual moisture content. Over-shrinkage can occur when the article is dried or cured below the tolerable residual moisture content. Over-shrinkage in turn can lead to micro fissures or visible crack defects in the molded article.

When the top or first part of the mold is opened, the molded article can remain in or on the bottom or second part of the mold or alternatively, can rise slightly during the opening of the mold. The slight rise can be related to the flow of air into mold and/or to the release mechanism of the mold release agent selected in accordance with the present invention. Air blowers can be used to aid in mold release.

The article can then be removed or discharged safely from the corresponding mold. Discharge can be accomplished by, for a non-limiting example, a pivoting robot arm or arms which each bear one or more vacuum cups. A single robot arm can be introduced per article, or an array of robot arms can be introduced for the substantially simultaneous retrieval of multiple items from multiple molds. Each robot arm can then deposit the corresponding retrieved item to a selected device, as necessary for further transport. Non-limiting examples of devices for orderly transport include conveyor belts, transport systems having dedicated receipt enclosures or cavities, or other devices for orderly transport and/or conveyance known to those of ordinary skill in the art.

Alternatively, in applications involving automatic demolding, after the mold or top part of the mold is opened, a vacuum suction device preferably can be used to lift, remove or otherwise discharge the article from the mold. Such a discharge method has safety advantages.

Other methods of demolding and ordered transport known to those of ordinary skill in the arts of manufacturing biodegradable packaging or wafer baking manufacture can be used.

In the molding phase, prior to or in parallel with transport and/or conveyance, suitable air blowing can be conducted to remove any bobbles including extruded molding material remaining in and/or around the molds.

The demolded articles can them be then cooled to a temperature in a range of 25 to 45° C. through exposure to an open-air environment or through a forced cooling mechanism.

After molding, optional further post-molding processing steps can be conducted. In one non-limiting example, the invention features active control of moisture in the molded article for enabling a select flexibility and rupture strength in the molded article.

Molded articles which include carbohydrate polymers including fibers and starches absorb and desorb moisture from the environment. The source of such moisture can include, for non-limiting examples, the relative humidity of the air and/or contact with a wet or liquid content containing different percentages of moisture respectively having corresponding different water activities. The percentage of moisture absorbed and/or desorbed by carbohydrate-based articles is physically regulated according to what can be called the sorption isotherm of the material. The article's moisture content affects the mechanical properties of the molded article.

For non-limiting examples, a carbohydrate-based molded article with a relatively lower moisture content can be brittle, an article with a relatively mid-range moisture content can be flexible, and an article with a relatively higher moisture content greater than 15 wt. % and sometimes even greater than 10 wt. % based on the total mass of the article can be soft and even soggy. Such sorption and/or desorption of carbohydrate articles can be drawbacks compared to most kinds of non-biodegradable and non-compostable plastic-based articles, select control of moisture sorption can be used to enable and/or enhance biodegradability and/or compostability, as necessary In a humidity range from zero to 100% relative humidity, the sorption isotherm for the carbohydrate-based molded articles has a sigmoid shape. Under dry conditions, when the relative humidity is low, the carbohydrate-based molded articles can lose moisture. Under humid conditions, when the relative humidity is high, the carbohydrate-based molded articles gain moisture. Although moisture gain can enable biodegradability and composting properties, too much moisture gain negatively affects the physical stability of the molded article.

Accordingly, the mechanical properties of the carbohydrate-based molded articles can change with the relative humidity of the environment in accordance with the composition of the article. Regarding the molding compositions of the present invention at a temperature of up to 50° C., at a relative humidity of less than 45%, the article can be brittle, at a relative humidity in a range of 45 to about 75%, the article can be flexible, and at a relative humidity of equal to or above 80%, the article can be soft. Although temperature has a less significant effect as compared to relative humidity where the articles are hot molded, loss of moisture may occur as the temperature increases beyond ambient temperature unless the relative humidity is sufficiently high in a range of approximately 45% to 70%.

In addition, the dimensions of the article can change as a function of moisture sorption and/or desorption, whereby the article can expand with a gain in moisture and shrink with a moisture loss. A maximum length/width shrinkage for the carbohydrate-based article is about 0.1% for a change of 1% in moisture content of the article. For a non-limiting example, an article of 200 mm in length might experience a 0.1% increase/decrease of 2 mm for every one percent of moisture gained/lost.

In contrast to the current art, the present invention features an active control of the moisture content of the biodegradable and compostable molded articles as required for many of the applications of such articles. In an embodiment, the invention features post thermal curing processing including a conditioning process. Such conditioning includes controlling actively a moisture content in a molded article. The molded articles can be positioned in an ordered way after molding or after molding and cooling and passed into an enclosed humidification section or chamber. In the enclosed humidification section, the articles are subjected to a humid air flow. The amount of water vapor made available to the article through the humid air flow is controlled by controlling the temperature, the relative humidity, and the flow rate and distribution of the incoming humid air flow while maintaining controlled, safe microbiological conditions in the humidification section or chamber. In addition, the active control of moisture in the molded article is further controlled by the selection of the dimensions of the article including, for example, the thickness and the surface area of the molded article. The active control of moisture in the molded article is further controlled by the selection of the humidification time, that is, the time period for processing an article enclosed in the humification section or chamber. The higher the relative humidity of the incoming humid air, the higher the temperature of the incoming humid air, the lower the overall mass and wall thickness of the molded article, the faster the molded article can sorb water and achieve the desired moisture level in the molded article.

In a non-limiting exemplary embodiment, the molded article has a moisture content after thermal curing in a range of 3 to 1.5 wt. % based on a total mass of the molded articles. Such an article can typically undergo humidification in a range from 15 to 60 minutes, preferably in a range from 20 to 50 minutes, and most preferably in a range from 20 to 45 minutes. After humidification the water activity of the molded article including the ability of the molded article to absorb water is preferably in a range of 0.45 to 0.70. More preferably, after humidification, the water activity of the molded articles in is a range of 0.50 to 0.70. The target water activity of the article is selected according to the corresponding target application for the article. The relative humidity in the modification chamber is preferably maintained at 80% to 99%, and more preferably at 85% to 98% for enabling a relatively quick humidification of the molded article. The selection of a higher relative humidity enables greater humidity exposure for the article, and the target water activity can be reached more quickly. Any condensation of moisture droplets on the molded articles must be excluded.

Other post-molding steps can include select modification of properties of the article through coating and/or sealing, impregnation, and/or lamination with compostable coatings. The coating and/or laminating steps can be selected for making the article more smooth, shiny, flexible, and/or waterproof.

In one embodiment, the post-molding step includes forming a biodegradable, compostable coating and/or a seal on and/or permeating at least a portion, such as for example a wall, of the molded article for modification of surface properties and/or for article stability for certain applications. For non-limiting examples, coating and/or sealing an article with a biodegradable, compostable layer can improve surface smoothness, shininess and gloss, can protect against sorption of moisture and/or oils, and/or can improve the mechanical strength properties such as impact strength, flexibility, or break resistance of the article. In other non-limiting examples, a biodegradable, compostable coating and/or a seal can provide water-repellent or waterproof properties to at least a portion of the exterior surface or side of the exterior surface and/or to the inside of the molded article.

The coating and/or sealing step can be accomplished according to different coating and sealing methods and materials known to those of ordinary skill in the art. For non-limiting examples, the coating and/or sealing step can include application of a biodegradable, compostable coating and/or seal to the molded article by spraying, curtain coating, dipping, and/or impregnating an interior matrix of the molded article with the solution.

The coating and/or sealing step can be applied using a coating fluid. The coating fluid can be a water-based solvent or a non-water-based solvent or a combination of both wherein the non-water-based solvent can be mixable with water. Non-limiting examples of coating fluids which can be used in the present invention include the coatings discussed in, for non-limiting examples, publications WO 2014105641, WO 2010085569, and U.S. Pat. No. 5,576,049.

The invention features a unique biodegradable, compostable coating solution. The biodegradable compostable coating solution includes a select ratio of a select liquid solvent base and a select solids portion. In a preferred embodiment, the select liquid solvent base includes water.

The invention also features a novel system and method for the application of a biodegradable, compostable coating solution to the molded article. The system includes a coating zone including a spraying device and a heating device. The method includes first spraying the molded article with the biodegradable, compostable coating solution followed by heating the sprayed molded article to a select temperature for a select drying time. In an alternative embodiment, the spraying and the heating can happen simultaneously.

The spraying device includes an atomizer. The atomizer emits a spray of a plurality of droplets of the biodegradable compostable coating solution onto the molded article.

The heating device includes an infrared drying device. The infrared heating device is used to heat the sprayed molded article to a select temperature to achieve a target water activity for the coated molded article.

After the application of the biodegradable, compostable coating solution, the coated molded article has a target water activity.

Figure 10:
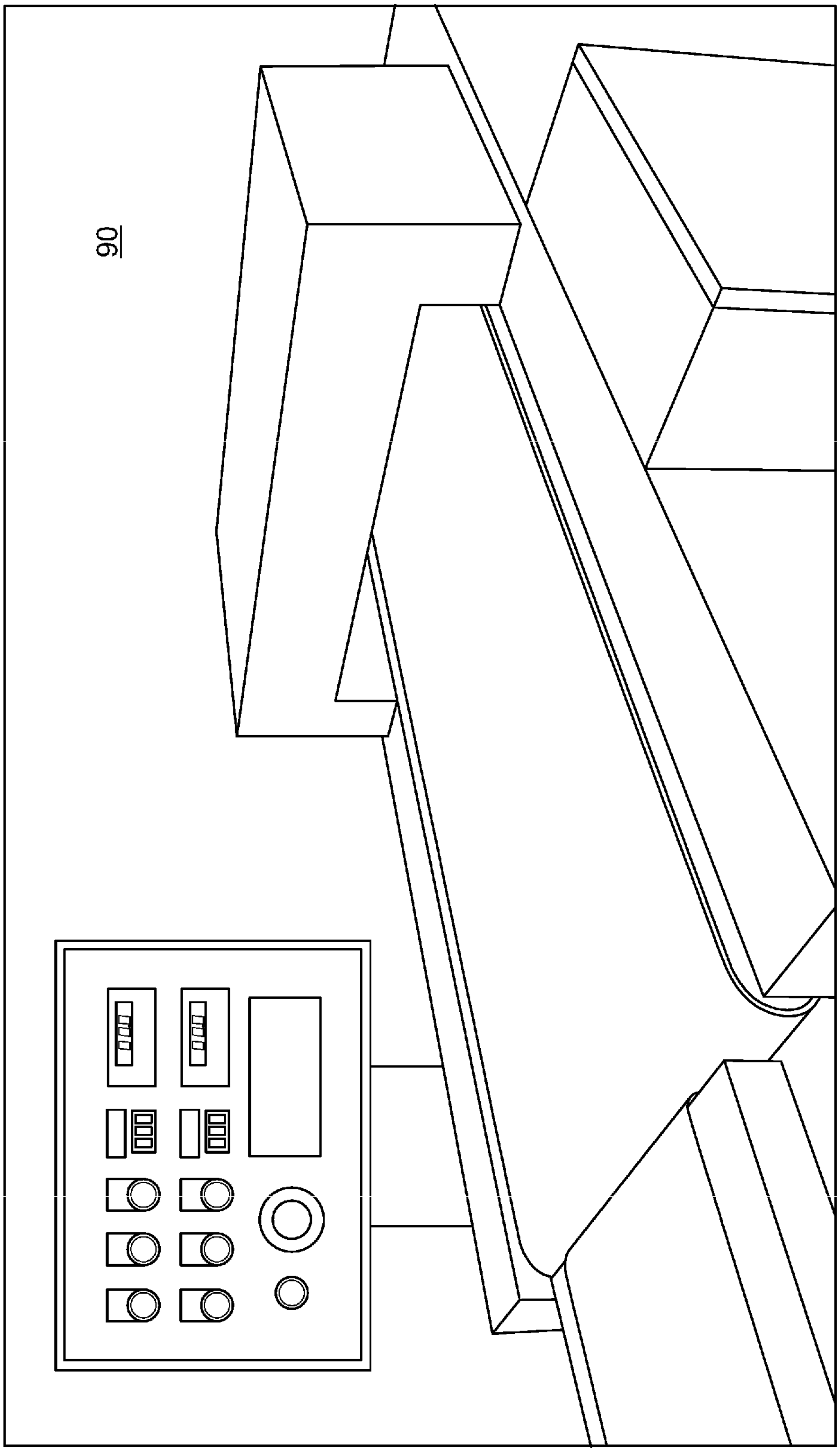
FIG. 10 shows a transfer belt for transportation of a molded article to a coating spraying zone according to an exemplary embodiment of the invention.

In an exemplary non-limiting embodiment, FIG. 10 shows a transfer belt where the molded article can be transported to a coating zone of the invention where a biodegradable, compostable coating can be applied to the molded article.

In another embodiment, the post-molding step can include applying a biodegradable, compostable film to the article. The step of applying a film can include laminating a biodegradable, compostable film to at least a portion of an exterior surface of the article. In a preferred embodiment, the lamination film includes a substantially uniform and non-defective film of a sufficient thickness for affecting at least one selected change in a surface property of the article.

The step of applying the film can include joining at least one additional layer to at least one portion of an exterior surface of the molded article. The film can be adhered to the molded article by thermally mediated adhesion, application of pressure, suction, wet bonding, drying bonding, use of an adhesive, and a combination of two or more of the aforementioned adherence methods. The adherence method can be selected based on the material of the layer, the shape and amount of the article to be covered, the desired thickness of the layer and other parameters known to those of ordinary skill in the art.

Non-limiting examples of laminating films which can be used in the present invention are discussed in publications US 2015/0337094 and U.S. Pat. No. 6,573,340 B.

Other post-molding steps can include modification of the surface of the article through, for non-limiting examples, printing and/or attachment of stickers.

After the molding and any post-molding steps, the articles can be stacked, sealed, marked and/or packaged, as necessary. The articles can then be loaded onto pallets and/or otherwise prepared for storage and/or distribution, as necessary, according to procedures known to those of ordinary skill in the art.

The following examples illustrate more specifically the molding mass compositions and preparations thereof, molded articles, and molding methods including optional post-molding steps according to the present invention.

Each of the following examples 1-12 refers to data which is provided in corresponding Tables 3-14 included in Attachment A of the present application.

Example 1

Referring to Table 3, a total of 8 runs was conducted each including the components including the sizing dispersions listed in the Ingredient column. The weight in grams of each component is provided in the corresponding column for each run. The term “WF” refers to wheat fiber from Rettenmaier, Germany, and the WF number refers to a select distribution of fiber length.

Experimental Procedure: For each run, the soluble phase was first prepared in accordance with Table 3. Cold water was metered. The soluble components including for example the sizing salts (such as borates, alum), urea, coloring agents etc. were dissolved in the water. The sizing agent or agents were dispersed in the soluble or aqueous phase.

For each run, the solid phase was then prepared in accordance with Table 1. The fibers, starchy flours and mold release agent powders were briefly blended using a kitchen aid type mixer with kneading arm at low speed of about 30 rpm.

The soluble phase was mixed into the vessel holding the solids phase and blended substantially homogeneously. After about a 1 minute period of mixing and blending, the texture and consistency of the mixture became plastic. The intensity of the kneading arm was increased to a range of approximately 300 to 600 rpm as a function of the volume contained in the mixer, and kneading was conducted for approximately 3 minutes.

The mixture was rested in a range of five minutes to 30 minutes at ambient temperature.

A portion in an amount of 60 grams plus or minus 0.5 grams was portioned into a corresponding mold.

The molding mass was cured for a curing duration time in a range of 5 minutes to 25 minutes at a curing temperature in a range of 22° C. to 26° C.

The resulting color, molding quality and an indication of any mold residue is provided for each run.

Example 2

Referring to Table 4, a total of 8 runs was conducted including the components including the sizing dispersions listed in the Ingredient column. The weight in grams of each component is provided in the corresponding column for each run.

The experimental procedure as outlined in Example 1 was followed.

The resulting color, molding quality and an indication of any mold residue is provided for each run.

Example 3

Referring to Table 5, a total of 8 runs was conducted including the components including the sizing dispersions listed in the Ingredient column. The weight in grams of each component is provided in the corresponding column for each run. The term E133 refers to a water-soluble food color named in accordance with the European Union food additive number system including E numbers. The term “TC” refers to a cellulose fiber product from Jeluwerk, Germany. For details on fiber length see https://www.jelu-werk.com/de/technische-industrie/produkte/funktionelle-cellulose/jelucel-tc/jelucel-tc/

The experimental procedure as outlined in Example 1 was followed.

The resulting color, molding quality and an indication of any mold residue is provided for each run.

Example 4

Referring to Table 6, a total of 8 runs was conducted including the components including the sizing dispersions listed in the Ingredient column. The weight in grams of each component is provided in the corresponding column for each run.

The experimental procedure as outlined in Example 1 was followed.

The resulting color, molding quality and an indication of any mold residue is provided for each run.

Example 5

Referring to Table 7, a total of 8 runs was conducted including the components including the sizing dispersions listed in the Ingredient column. The weight in grams of each component is provided in the corresponding column for each run.

The experimental procedure as outlined in Example 1 was followed.

The resulting color, molding quality and an indication of any mold residue is provided for each run.

Example 6

Referring to Table 8, a total of 8 runs was conducted including the components including the sizing dispersions listed in the Ingredient column. The weight in grams of each component is provided in the corresponding column for each run. The term “DS” refers to degree of substitution, where the number immediately following the term “DS” identifies the degree of substitution which characterizes the modified starches as used.

The experimental procedure as outlined in Example 1 was followed.

The resulting color, molding quality and an indication of any mold residue is provided for each run.

Example 7

Referring to Table 9, a total of 8 runs was conducted including the components including the sizing dispersions listed in the Ingredient column. The weight in grams of each component is provided in the corresponding column for each run. The term "pregelled pd." refers to pregelatinized powder.

The experimental procedure as outlined in Example 1 was followed.

The resulting color, molding quality and an indication of any mold residue is provided for each run.

Example 8

Referring to Table 10, a total of 8 runs was conducted including the components including the sizing dispersions listed in the Ingredient column. The weight in grams of each component is provided in the corresponding column for each run.

The experimental procedure as outlined in Example 1 was followed.

The resulting color, molding quality and an indication of any mold residue is provided for each run.

Example 9

Referring to Table 11, a total of 8 runs was conducted including the components including the sizing dispersions listed in the Ingredient column. The weight in grams of each component is provided in the corresponding column for each run.

The experimental procedure as outlined in Example 1 was followed.

The resulting color, molding quality and an indication of any mold residue is provided for each run.

Example 10

Referring to Table 12, a total of 8 runs was conducted including the components including the sizing dispersions listed in the Ingredient column. The weight in grams of each component is provided in the corresponding column for each run.

The experimental procedure as outlined in Example 1 was followed.

The resulting color, molding quality and an indication of any mold residue is provided for each run.

Example 11

Referring to Table 13, a total of 8 runs was conducted including the components including the sizing dispersions listed in the Ingredient column. The weight in grams of each component is provided in the corresponding column for each run.

The experimental procedure as outlined in Example 1 was followed.

The resulting color, molding quality and an indication of any mold residue is provided for each run.

Example 12

Referring to Table 14, a total of 8 runs was conducted including the components including the sizing dispersions listed in the Ingredient column. The weight in grams of each component is provided in the corresponding column for each run.

The experimental procedure as outlined in Example 1 was followed.

The resulting color, molding quality and an indication of any mold residue is provided for each run.

Example 13

Crush strength and thermal resistance measurements were conducted for Styrofoam cups, paper cups and prototype biodegradable and compostable cups of the invention.

Each cup type was tested for crush strength in two different directions. Regarding the first directional test, each cup type was tested by applying force in a direction perpendicular to the bottom and rim of the cup. Both the Styrofoam and prototype cups failed at the ribbed areas. The paper cup exceeded the force that could be applied by the tester. Regarding the second directional test, each cup type was tested by applying force to the sides of the cups. None of the cups failed the second directional test, but instead simply flexed is response to the applied force The peak force required to bend each cup type was recorded.

Figure 11:
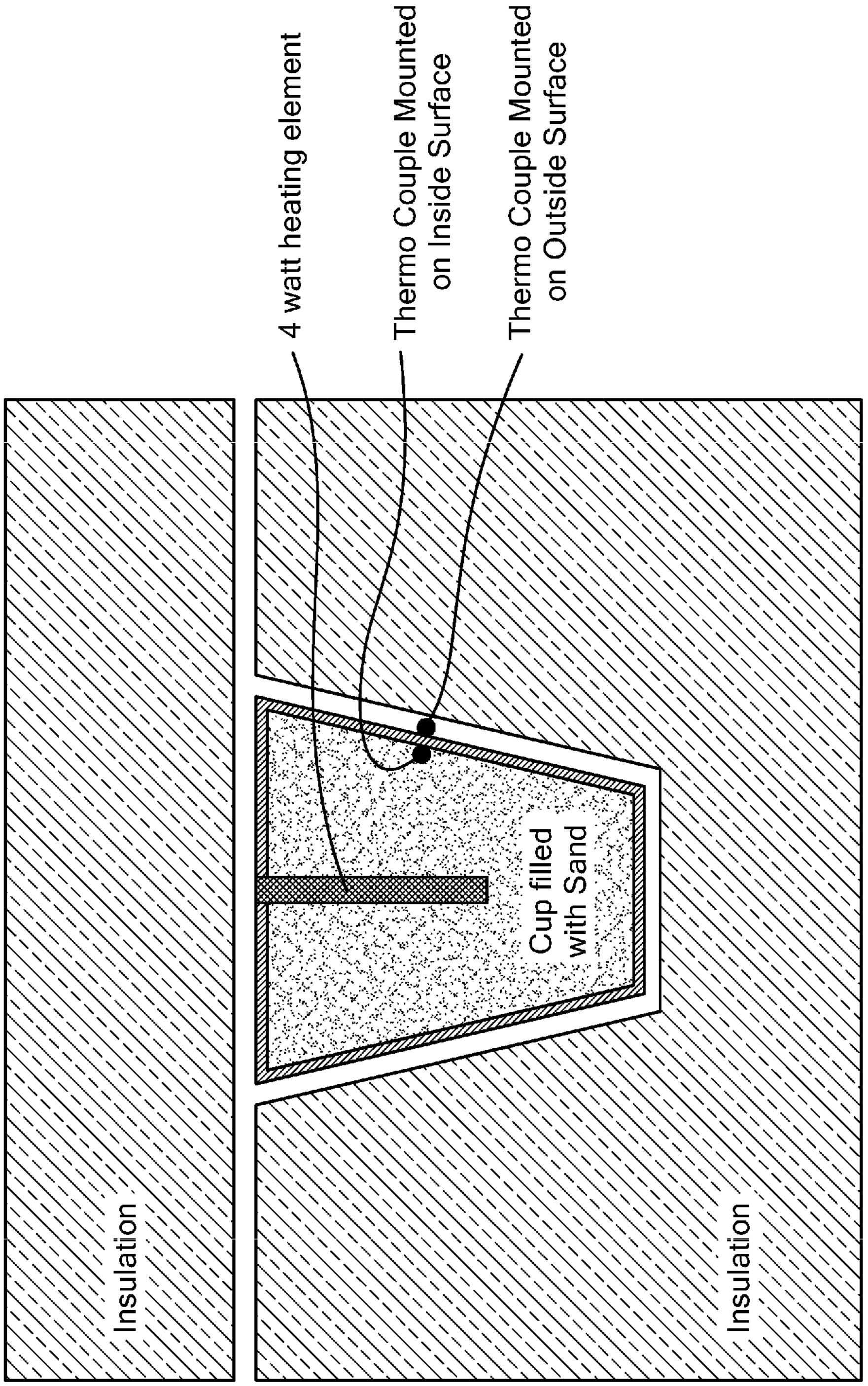
FIG. 11 shows a schematic of the thermal resistance test assembly as described in Example 6 of the detailed description.

Each cup type was measured for thermal resistance. Referring to FIG. 11, in each cup, a thermocouple was mounted on the inside and on the outside surface of the cup. Each probe of the inside thermocouple was mounted directly opposite the probe of the corresponding outside thermocouple. Each cup was filled with sand and a 4.5-watt heating element inserted into the center of the sand. The entire perimeter of this assembly of each cup was insulated. The heating element of each cup was powered and the temperature differential between the two thermocouples was recorded. The thermal resistance was calculated using the following equation:

$$R=\Delta T/Q_a$$

where R is the thermal resistance, ΔT is equal to the differential temperature across the thickness of the material and $Q_a$ is the heat flow per unit area, and the units of R are measured or calculated in $ft^2$ hr° F./Btu. The values were presented for the actual material thickness and a per inch basis. Table 15 provides a summary of the results.

TABLE 15

Test Results

| | Caliper, | Crush Strength peak force, lbs | | Thermal resistance, ft 2 hr F./btu | | |
|---|---|---|---|---|---|---|
| Sample | in | Side | end | Δt @ 100 F. | r-value | r-value/in |
| Styrofoam | 0.075 | 0.8 | 17.5 | 24 | 0.361 | 4.8 |
| Paper | 0.011 | 1 | >100 | 2 | 0.029 | 2.6 |
| Bio-degradable | 0.09 | 2.5 | 45.7 | 19 | 0.236 | 2.6 |

Table 15 shows that the inventive biodegradable and compostable cups have a higher side crush strength as compared to both the Styrofoam and Paper cups, and an end crush strength which more than twice that of the Styrofoam cup although less than the paper cup. Although the thermal resistance of the biodegradable and compostable cups of the present invention is less than that of the Styrofoam cup, it achieves the same thermal resistance as the paper cup.

Example 14

Figure 12:
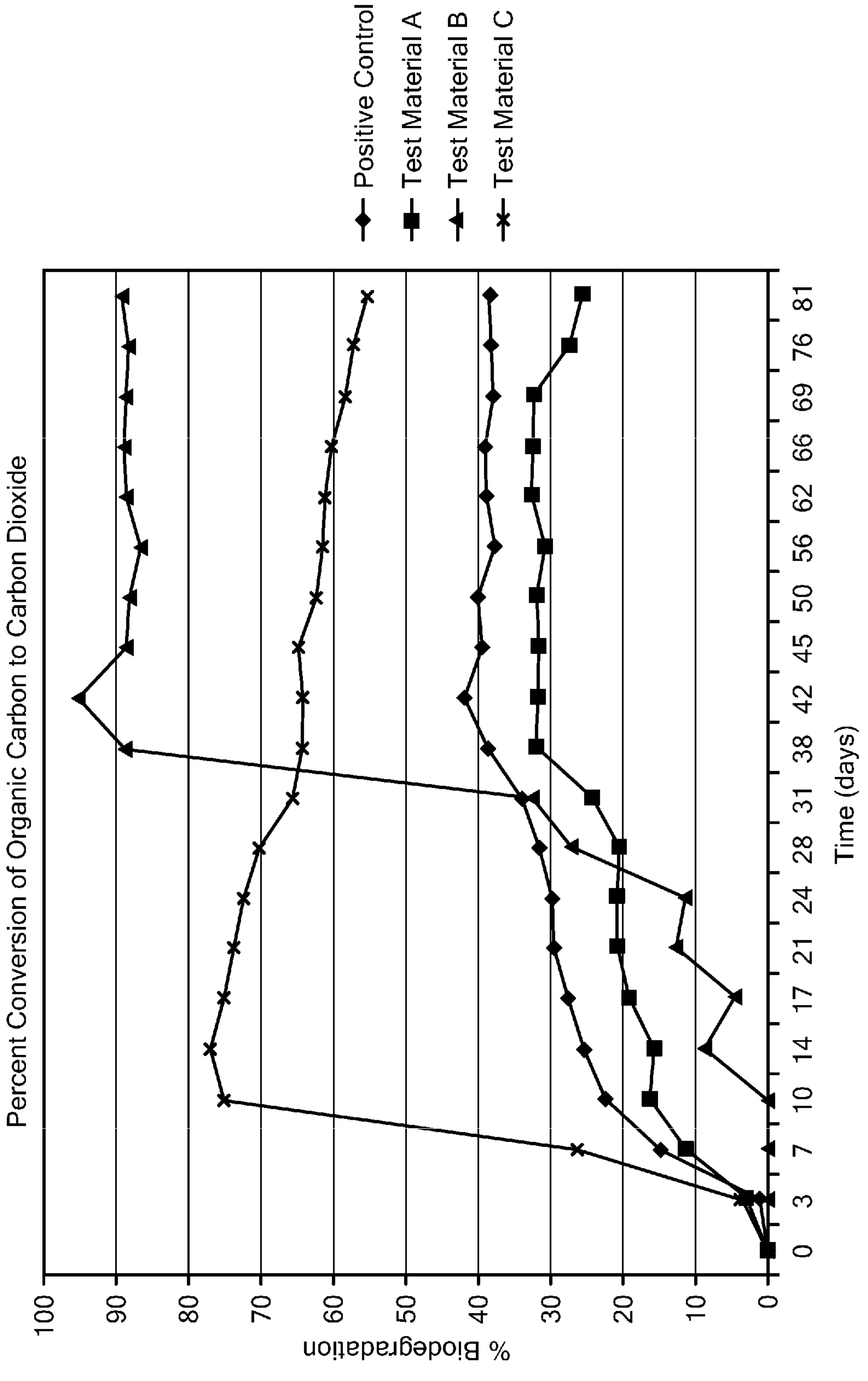
FIG. 12 shows the percent conversion of organic carbon to carbon dioxide for a control compost sample and three test samples.

A control compost sample and three test samples A, B and C were prepared according to Table 16 included in Attachment A. The biodegradation potential of each of the control and test samples were then assessed using ASTM D5538. A summary of the test results are provided in Table 17 included in Attachment A and shown in the graph of FIG. 12.

While the invention has been described in detail herein in accordance with certain preferred embodiments, modifications and changes therein may be affected by those skilled in the art without departing from the spirit of the invention. Accordingly, it is the intent to be limited only by the scope of the appending claims and not by way of the details and instrumentalities describing the embodiments shown herein.

It is to be understood that variations and modifications can be made on the compositions, articles, devices, systems, and methods without departing from the concepts of the present invention, and further it is to be understood that such concepts are intended to be covered by the following claims unless these claims by their language expressly state otherwise.

A wide range of further embodiments of the present invention is possible without departing from its spirit and essential characteristics. The embodiments as discussed here are to be considered as being illustrative only in all aspects and not restrictive. The following claims indicate the scope of the invention rather than the foregoing description.

ATTACHMENT A

TABLE 3

| Water Rosins | | | | | | | | |
|---|---|---|---|---|---|---|---|---|
| | Run # | | | | | | | |
| Ingredient | 1 | 2 | 3 | 4 | 5 | 6 | 7 | 8 |
| Water, approx. | 295 | 305 | 315 | 305 | 305 | 305 | 305 | 305 |
| Alkene dimer sizing dispersion, 10% | 10 | 10 | 5 | 0 | 0 | 0 | 5 | |
| Rosin type sizing dispersion, 10% | 0 | 0 | 0 | 5 | 0 | 10 | 5 | 0 |
| Vitacel WF600 cellulose fibers | 55 | 55 | 55 | 55 | 55 | 55 | 55 | 55 |
| Stearic acid, powder | 4 | 4 | 4 | 4 | 4 | 4 | 4 | 4 |
| Uera | 4 | 4 | 4 | 4 | 4 | 4 | 4 | 4 |
| Starch, potato, native | 200 | 200 | 200 | 200 | 200 | 200 | 200 | 200 |
| Total | 568 | 578 | 588 | 578 | 568 | 578 | 573 | 573 |
| Color | white | white | white | white | white | white | white | white |
| Quality of molding | exellent | exellent | exellent | exellent | exellent | exellent | exellent | exellent |
| Mold residues | no | no | no | no | no | no | no | no |

TABLE 4

| Wheat Potato Corn Tapoca | | | | | | | | |
|---|---|---|---|---|---|---|---|---|
| | Run # | | | | | | | |
| Ingredient | 9 | 10 | 11 | 12 | 13 | 14 | 15 | 16 |
| Water, approx. | 300 | 300 | 300 | 300 | 290 | 270 | 270 | 270 |
| Vitacel WF600 cellulose fibers | 40 | 40 | 0 | 40 | 40 | 40 | 40 | 40 |
| Vitacel WF200 cellulose fibers | 0 | 0 | 40 | 0 | 0 | 0 | 0 | 0 |
| Stearic acid, powder | 3 | 0 | 3 | 3 | 4 | 3 | 3 | 3 |
| Magnesium stearate, powder | 0 | 3 | 0 | 0 | 0 | 0 | 0 | 0 |
| Enzyme Biobake CHW | 0 | 0 | 0 | 0.01 | 0.01 | 0 | 0 | 0 |
| Wheat Flour | 0 | 0 | 0 | 185 | 95 | 0 | 0 | 0 |
| Starch, potato, native | 190 | 190 | 190 | 0 | 95 | 95 | 95 | 0 |
| Starch, corn, native | 0 | 0 | 0 | 0 | 0 | 95 | 0 | 0 |
| Starch, tapioca, native | 0 | 0 | 0 | 0 | 0 | 0 | 95 | 190 |
| Total | 193 | 193 | 193 | 188.01 | 194.01 | 193 | 193 | 193 |
| Color | white | white | white | brownish | beige | whitish | white | white |
| Quality of molding | excellent | excellent | very good | good | very good | good | very good | good |
| Mold residues | no | traces | no | slightly | slightly | no | no | no |

TABLE 5

| Fib Col Leav | | | | | | | | |
|---|---|---|---|---|---|---|---|---|
| Oct. 3, 2027 | Run # | | | | | | | |
| Ingredient | 17 | 18 | 19 | 20 | 21 | 22 | 23 | 24 |
| Water, approx. | 280 | 305 | 300 | 280 | 230 | 280 | 280 | 280 |
| Carbon black E133, powder | 0 | 0 | 0 | 0 | 0 | 0.2 | 0 | 0 |
| Magnetite, powder | 0 | 0 | 0 | 0 | 0 | 0 | 1 | 2 |
| Cellulose fiber TC300 | 0 | 0 | 0 | 0 | 40 | 0 | 0 | 0 |
| Vitacel WF600 cellulose fibers | 0 | 0 | 0 | 0 | 0 | 0 | 35 | 35 |
| Vitacel WF200 cellulose fibers | 35 | 35 | 35 | 35 | 0 | 35 | 0 | 0 |
| Stearic acid, powder | 4.4 | 4.4 | 4.4 | 4.4 | 4.4 | 4 | 4 | 4 |
| Sodium bicarbonate | 0 | 0 | 0 | 1.5 | 1.5 | 0 | 0 | 0 |
| Sodium acid pyrophosphate | 0 | 0 | 3.5 | 0 | 0 | 1 | 0 | 0 |
| Starch, potato, native | 200 | 200 | 200 | 200 | 185 | 200 | 200 | 200 |
| Total | 519.4 | 544.4 | 542.9 | 520.9 | 460.9 | 520.2 | 520 | 521 |
| Color | white | white | white | tan | tan | grey | greyish | grey |
| Quality of molding | excellent | excellent | excellent | good | good | good | good | good |
| Mold residues | no | no | no | no | no | no | no | no |

TABLE 6

| CaCO3 Terra alba | | | | | | | | |
|---|---|---|---|---|---|---|---|---|
| | Run # | | | | | | | |
| Ingredient | 25 | 26 | 27 | 28 | 29 | 30 | 31 | 32 |
| Water, approx. | 280 | 300 | 320 | 320 | 320 | 320 | 325 | 330 |
| Vitacel WF600 cellulose fibers | 0 | 0 | 58 | 58 | 58 | 58 | 58 | 58 |
| Vitacel WF200 cellulose fibers | 35 | 35 | 0 | 0 | 0 | 0 | 0 | 0 |
| Stearic acid, powder | 4 | 4 | 5 | 5 | 5 | 5 | 5 | 5 |
| Calcium carbonate, powder | 0 | 0 | 0 | 0 | 10 | 5 | 15 | 20 |
| Terra alba | 0 | 10 | 0 | 10 | 0 | 5 | 10 | 10 |
| Starch, potato, native | 200 | 200 | 200 | 200 | 200 | 200 | 200 | 200 |
| Total | 519 | 549 | 583 | 593 | 593 | 593 | 613 | 623 |
| Color | white | white | white | white | white | white | white | white |
| Quality of molding | excellent | good | excellent | good | excellent | excellent | excellent | good |
| Mold residues | no | slight | no | slight | traces | traces | slight | slight |

TABLE 7

| Starches<br>Dec. 5, 2017 | | | | | | | | |
|---|---|---|---|---|---|---|---|---|
| | Run # | | | | | | | |
| Ingredient | 33 | 34 | 35 | 36 | 37 | 38 | 39 | 40 |
| Water, approx. | 280 | 280 | 280 | 300 | 290 | 285 | 285 | 285 |
| Vitacel WF600 cellulose fibers | 40 | 40 | 40 | 40 | 40 | 40 | 40 | 0 |
| Vitacel WF200 cellulose fibers | 0 | 0 | 0 | 0 | 0 | 0 | 0 | 40 |
| Stearic acid, powder | 4 | 4 | 4 | 4 | 4 | 4 | 4 | 4 |
| Starch, potato, hydroxypropylated, native | 0 | 0 | 0 | 0 | 0 | 15 | 30 | 15 |
| Starch, potato, native | 150 | 150 | 100 | 0 | 100 | 185 | 170 | 185 |
| Starch, potato, less refined, native | 0 | 0 | 0 | 200 | 100 | 0 | 0 | 0 |
| Starch, wheat, native | 50 | 0 | 0 | 0 | 0 | 0 | 0 | 0 |
| Starch, pea, native | 0 | 50 | 100 | 0 | 0 | 0 | 0 | 0 |
| Total | 524 | 524 | 524 | 544 | 534 | 529 | 529 | 529 |
| Color | white | white | whitish | tan | tan | white | white | white |
| Quality of molding | good | good | good | good | good | excellent | excellent | excellent |
| Mold residues | no | no | no | no | no | no | no | no |

TABLE 8

Starches mod
Mar. 6, 2018

| Ingredient | Run # 41 | 42 | 43 | 44 | 45 | 46 | 47 | 48 |
|---|---|---|---|---|---|---|---|---|
| Water, approx. | 285 | 285 | 285 | 285 | 310 | 295 | 315 | 330 |
| Vitacel WF600 cellulose fibers | 40 | 40 | 40 | 40 | 40 | 50 | 55 | 65 |
| Stearic acid, powder | 4 | 4 | 4 | 4 | 4 | 4 | 5.5 | 6 |
| Urea | 0 | 0 | 0 | 0 | 0 | 0 | 4 | 0 |
| Starch, potato, cationic, DS 0.025, native | 15 | 0 | 0 | 0 | 0 | 0 | 0 | 0 |
| Starch, potato, cationic, DS 0.05, native | 0 | 15 | 0 | 0 | 0 | 0 | 0 | 0 |
| Starch, potato, native | 185 | 185 | 185 | 185 | 185 | 200 | 200 | 200 |
| Starch, potato, less refined, native | 0 | 0 | 0 | 0 | 20 | 0 | 0 | 0 |
| Starch, pea, cationic, DS 0.02, native | 0 | 0 | 15 | 0 | 0 | 0 | 0 | 0 |
| Starch, pea, cationic, DS 0.05, native | 0 | 0 | 0 | 15 | 15 | 0 | 0 | 0 |
| Total | 529 | 529 | 529 | 529 | 574 | 549 | 579.5 | 601 |
| Color | white | white | white | white | whitish | white | white | white |
| Quality of molding | excellent | good | good | good | good | excellent | excellent | excellent |
| Mold residues | no | no | no | no | no | no | no | no |

TABLE 9

Fibers Pregel
Mar. Jun., 7, 2020, 2018

| Ingredient | Run # 49 | 50 | 51 | 52 | 53 | 54 | 55 | 56 |
|---|---|---|---|---|---|---|---|---|
| Water, approx. | 360 | 400 | 315 | 315 | 340 | 340 | 340 | 400 |
| Vitacel WF600 cellulose fibers | 80 | 100 | 55 | 0 | 55 | 55 | 55 | 85 |
| Vitacel WF200 cellulose fibers | 0 | 0 | 0 | 55 | 0 | 0 | 0 | 0 |
| Stearic acid, powder | 6 | 6 | 4 | 4 | 4 | 4 | 4 | 4 |
| Urea | 0 | 0 | 0 | 4 | 4 | 4 | 4 | 4 |
| Starch, potato, native | 200 | 200 | 200 | 200 | 160 | 160 | 160 | 85 |
| Starch, potato, pregelled, pd. | 0 | 0 | 0 | 0 | 40 | 0 | 0 | 0 |
| Starch, corn, pregelled, pd. | 0 | 0 | 0 | 0 | 0 | 40 | 0 | 85 |
| Starch, rice, pregelled, pd. | 0 | 0 | 0 | 0 | 0 | 0 | 40 | 0 |
| Total | 646 | 706 | 574 | 578 | 603 | 603 | 603 | 663 |
| Color | white | white | white | white | white | white | white | white |
| Quality of molding | good | good | good | good | excellent | excellent | excellent | excellent |
| Mold residues | no | no | no | no | no | no | no | no |

TABLE 10

Fiber var
March 2020/2021, 2018
June 13-16

| Ingredient | Run # 57 | 58 | 59 | 60 | 61 | 62 | 63 | 64 |
|---|---|---|---|---|---|---|---|---|
| Water, approx. | 430 | 420 | 410 | 275 | 370 | 390 | 330 | 300 |
| Calcium carbonate, powder | 0 | 0 | 0 | 0 | 20 | 0 | 0 | 0 |
| Vitacel WF600 cellulose fibers | 110 | 100 | 90 | 30 | 80 | 90 | 60 | 60 |
| Calcium sulphate, powder | 0 | 0 | 0 | 5 | 0 | 3 | 2 | 2 |
| Stearic acid, powder | 4 | 4 | 4 | 3 | 4 | 3 | 3 | 3 |
| Urea | 5 | 5 | 5 | 0 | 4 | 4 | 4 | 4 |
| Starch, potato, native | 150 | 160 | 170 | 130 | 200 | 200 | 220 | 200 |
| Soy bran flour, powder | 0 | 0 | 0 | 80 | 0 | 0 | 0 | 0 |
| Starch, potato, pregelled, pd. | 0 | 0 | 0 | 0 | 20 | 20 | 20 | 20 |
| Starch, corn, pregelled, pd. | 40 | 40 | 40 | 20 | 0 | 0 | 0 | 0 |
| Total | 739 | 729 | 719 | 543 | 698 | 710 | 639 | 589 |
| Color | white | white | white | brown | white | white | white | white |
| Quality of molding | excellent | excellent | excellent | good | good | good | good | good |
| Mold residues | no | no | no | traces | no | no | no | no |

TABLE 11

| Release Agent June 13-16 November 5-8 | | | | | | | | |
|---|---|---|---|---|---|---|---|---|
| | Run # | | | | | | | |
| Ingredient | 65 | 66 | 67 | 68 | 69 | 70 | 71 | 72 |
| Water, approx. | 335 | 345 | 312 | 312 | 312 | 312 | 312 | 312 |
| Vitacel WF600 cellulose fibers | 55 | 75 | 60 | 60 | 60 | 60 | 60 | 60 |
| Calcium sulphate, powder | 2 | 2 | 0 | 0 | 0 | 2 | 2 | 2 |
| Magnesium stearate, powder | 0 | 0 | 0 | 3.5 | 7 | 0 | 3.5 | 7 |
| Stearic acid, powder | 3 | 3 | 7 | 3.5 | 0 | 7 | 3.5 | 0 |
| Urea | 4 | 4 | 5.5 | 5.5 | 5.5 | 5.5 | 5.5 | 5.5 |
| Starch, potato, native | 200 | 200 | 200 | 200 | 200 | 200 | 200 | 200 |
| Starch, potato, pregelled, pd. | 10 | 10 | 0 | 0 | 0 | 0 | 0 | 0 |
| Total | 609 | 639 | 584.5 | 584.5 | 584.5 | 586.5 | 586.5 | 586.5 |
| Color | white | white | white | white | white | white | white | white |
| Quality of molding | excellent | excellent | excellent | excellent | excellent | excellent | excellent | excellent |
| Mold residues | no | no | no | traces | traces | no | traces | traces |

TABLE 12

| Magnetite November 5-8 | | | | | | | | |
|---|---|---|---|---|---|---|---|---|
| | Run # | | | | | | | |
| Ingredient | 73 | 74 | 75 | 76 | 77 | 78 | 79 | 80 |
| Water, approx. | 315 | 315 | 315 | 325 | 325 | 325 | 325 | 340 |
| Alkene dimer sizing dispersion, 10% | 10 | 10 | 10 | 0 | 0 | 0 | 0 | 0 |
| Vitacel WF600 cellulose fibers | 60 | 60 | 60 | 60 | 60 | 60 | 60 | 68.5 |
| Stearic acid, powder | 7 | 7 | 7 | 7 | 7 | 7 | 7 | 7 |
| Urea | 0 | 5.5 | 5.5 | 5.5 | 5.5 | 5.5 | 5.5 | 5.5 |
| Starch, potato, native | 200 | 200 | 200 | 200 | 200 | 200 | 200 | 200 |
| Magnetite, powder | 0 | 0 | 5.5 | 0 | 5.5 | 2.75 | 8.25 | 0 |
| Total | 592 | 597.5 | 603 | 597.5 | 6.3 | 600.25 | 605.75 | 621 |
| Color | white | white | grey | white | grey | grey | dark grey | white |
| Quality of molding | good | excellent | excellent | excellent | excellent | excellent | excellent | excellent |
| Mold residues | no | no | no | no | no | no | traces | no |

TABLE 13

| Starch Mod November 5-8 | | | | | | | | |
|---|---|---|---|---|---|---|---|---|
| | Run # | | | | | | | |
| Ingredient | 81 | 82 | 83 | 84 | 85 | 86 | 87 | 88 |
| Water, approx. | 315 | 315 | 315 | 315 | 325 | 325 | 325 | 325 |
| Alkene dimer sizing dispersion, 10% | 10 | 10 | 10 | 0 | 0 | 0 | 0 | 0 |
| Vitacel WF600 cellulose fibers | 60 | 60 | 60 | 60 | 60 | 60 | 60 | 60 |
| Magnesium stearate, powder | 3.5 | 0 | 0 | 3.5 | 0 | 0 | 0 | 0 |
| Stearic acid, powder | 3.5 | 7 | 7 | 3.5 | 7 | 7 | 7 | 7 |
| Urea | 0 | 5.5 | 5.5 | 5.5 | 5.5 | 5.5 | 5.5 | 5.5 |
| Starch, potato, hydroxypropylated, native | 0 | 0 | 15 | 0 | 0 | 15 | 0 | 15 |
| Starch, potato, native | 200 | 200 | 185 | 200 | 200 | 185 | 200 | 185 |
| Starch, corn, pregelled, pd. | 0 | 10 | 0 | 0 | 10 | 0 | 10 | 0 |
| Magnetite, powder | 0 | 0 | 5.5 | 0 | 5.5 | 5.5 | 0 | 0 |
| Total | 592 | 607.5 | 6.3 | 597.5 | 613 | 603 | 607.5 | 597.5 |
| Color | white | white | grey | white | grey | grey | white | white |
| Quality of molding | excellent | excellent | excellent | excellent | excellent | excellent | excellent | excellent |
| Mold residues | traces | no | no | traces | no | no | no | no |

TABLE 14

Fiber, Pregelatinized Starch
November 5-8

| Ingredient | Run # 89 | 90 | 91 | 92 | 93 | 94 | 95 | 96 |
|---|---|---|---|---|---|---|---|---|
| Water, approx. | 420 | 420 | 370 | 370 | 345 | 345 | 315 | 315 |
| Vitacel WF600 cellulose fibers | 110 | 110 | 90 | 90 | 75 | 75 | 55 | 55 |
| Stearic acid, powder | 5 | 5 | 5 | 5 | 5 | 5 | 5 | 5 |
| Urea | 5 | 5 | 5 | 5 | 5 | 5 | 5 | 5 |
| Starch, potato, htdroxypropylated, native | 0 | 0 | 0 | 0 | 0 | 0 | 0 | 15 |
| Starch, potato, native | 200 | 200 | 200 | 200 | 200 | 200 | 200 | 185 |
| Starch, corn, pregelled, pd. | 40 | 40 | 20 | 20 | 10 | 10 | 10 | 0 |
| Magnetite, powder | 0 | 6 | 0 | 6 | 0 | 5 | 0 | 4.5 |
| Total | 780 | 786 | 690 | 696 | 640 | 645 | 590 | 584.5 |
| Color | white | grey | white | grey | white | grey | white | grey |
| Quality of molding | excellent | excellent | excellent | excellent | excellent | excellent | excellent | excellent |
| Water, approx. | no | no | no | no | no | no | no | no |

TABLE 15

Preliminary Analytical

| Analytes | Result | Units | LDQ | Method |
|---|---|---|---|---|
| Compost | | | | |
| Wet Chemistry | | | | |
| Organic Carbon | 19.30 | % | N/A | |
| TKN | 11000 | mg/Kg dry | 0.10 | SM4500-NORG-C |
| Percent Solids | 35 | % | N/A | % calculation |
| pH | 7.01 | N/A | 1.00 | ASTM D5338 |
| Total Volatile Solids | 56.1 | % | 1.00 | SM 2540G |

| Analytes | Result | Units | PQL | Method |
|---|---|---|---|---|
| Wet Chemistry | | | | |
| Sample A | | | | |
| Organic Carbon | 30.24 | % | N/A | |
| TKN | 4960 | mg/Kg dry | 0.10 | SM4500-NORG-C |
| Percent Solids | 7.2 | % | N/A | % calculation |
| pH | N/A | N/A | N/A | N/A |
| Total Volatile Solids | 75.6 | % | 1.00 | SM 2540G |

TABLE 15-continued

Preliminary Analytical

| Analytes | Result | Units | PQL | Method |
|---|---|---|---|---|
| Sample B | | | | |
| Organic Carbon | 40.58 | % | N/A | |
| TKN | 5600 | mg/Kg dry | 0.10 | SM4500-NORG-C |
| Percent Solids | 8.2 | % | N/A | % calculation |
| pH | N/A | N/A | N/A | N/A |
| Total Volatile Solids | 99.0 | % | 1.00 | SM 2540G |
| Sample C | | | | |
| Organic Carbon | 40.88 | % | N/A | |
| TKN | 7210 | mg/Kg dry | 0.10 | SM4500-NORG-C |
| Percent Solids | 8.0 | % | N/A | % calculation |
| pH | N/A | N/A | N/A | N/A |
| Total Volatile Solids | 92.0 | % | 1.00 | SM 2540G |

QA/QC Notes & Observations
Holding Times: All samples analyzed within specified holding times
Calibration: The instrument calibrations were within accepted criteria
Method Blanks: Method blanks were below MDL.
Comments: N/A = not applicable; N/D = not detected; N/S = not sampled
Qualifiers: None

TABLE 17

Summary of Test Results
Material ID

The following summary of test results shows the highest performing replicate of the test and provides and upeer bound of biodegradation potential in an optimal compost setting as described in ASTM D 5338.

| | | | | | |
|---|---|---|---|---|---|
| Positive Control | 0 | 0.9388073 | 14.958468 | 22.46662 | 25.42897 |
| Test Material A | 0 | 2.972381 | 11.401048 | 16.18077 | 15.75617 |
| Test Material B | 0 | 0 | 0 | 0 | 8.872016 |
| Test Material C | 0 | 3.8552381 | 26.566705 | 74.9659 | 76.96016 |
| Sample Day | 0 | 3 | 7 | 10 | 14 |
| Positive Control | 27.5686 | 29.56695 | 29.84278 | 31.59677 | 34.0498 |
| Test Material A | 19.03211 | 20.59458 | 20.67592 | 20.43657 | 24.08838 |
| Test Material B | 4.275604 | 12.81624 | 11.32639 | 27.03291 | 32.81767 |
| Test Material C | 75.06731 | 73.73029 | 72.26374 | 70.12354 | 65.50229 |
| Sample Day | 17 | 21 | 24 | 28 | 31 |

Quality control review may have led to one or more individual data points be omitted in the summary. The full data and calculations are provided below.

| | | | | | | |
|---|---|---|---|---|---|---|
| Positive Control | 0 | 38.95356 | 41.91201 | 39.58858 | 40.10511 | 37.8363 |
| Test Material A | 0 | 31.88263 | 31.80651 | 31.45627 | 32.03684 | 30.73084 |
| Test Material B | 0 | 88.84009 | 95.17799 | 88.64971 | 88.26914 | 86.78257 |

TABLE 17-continued

| Summary of Test Results Material ID | | | | | | |
|---|---|---|---|---|---|---|
| Test Material C | 0 | 64.14358 | 64.31384 | 64.71663 | 62.3672 | 61.4272 |
| Sample Day | 0 | 38 | 42 | 45 | 50 | 56 |
| Positive Control | 39.13771 | 39.07212 | 38.13385 | 38.32117 | 388.53835 | |
| Test Material A | 32.66157 | 32.53355 | 32.27596 | 27.64594 | 25.58625 | |
| Test Material B | 88.72958 | 89.06985 | 88.71356 | 88.37761 | 89.2674 | |
| Test Material C | 61.26672 | 60.21696 | 58.47626 | 57.22672 | 55.47771 | |
| Sample Day | 62 | 66 | 69 | 76 | 81 | |

What is claimed is:

1. A method for preparing a molding mass comprising the steps of:

selecting a liquid component;

wherein the liquid component includes a water component;

selecting a non-liquid soluble solid component;

wherein the non-liquid soluble solid component includes a starch component and a fiber component;

wherein a starch/fiber wt. % ratio is in a range of 94 wt. % of the starch component: 6 wt. % of the fiber component to 49 wt. % of the starch component: 51 wt. % of the fiber component;

wherein the starch component includes a plurality of starch granules having a select granule diameter size range including a granule diameter lower limit and a granule diameter upper limit; and wherein the fiber component includes a plurality of fibers, each of the plurality of fibers having a fiber length in a range of 1-250 times the granule diameter upper limit;

mixing and kneading the liquid component and the non-liquid soluble solid component using a preparation system for forming a molding mass having a first plastic-elastic texture and consistency characterized by a total liquid content in the molding mass including the liquid content in a range of 57 to 65 wt. % based on a total mass of the molding mass composition; and wherein the starch comprises a physically modified starch having a pregelatinized starch in a form of a powder, the pregelatinized starch being in a range of 2 wt. % to 26 wt. % based on the total mass of the starch component;

wherein a molding mass based on the molding composition including the pregelatinized starch is elastic and cohesive which in turn assists in the distribution of the molding mass substantially evenly throughout a mold while simultaneously limiting or avoiding the occurrence of voids during molding mass deposition process without requiring shuttle mechanism conditioning.

2. The method of claim 1 wherein the mixing and kneading step comprises a step of adding step-wise the liquid component to the non-liquid soluble solid component during the mixing and kneading step.

3. The method for preparing a molding mass according to claim 1 further comprising a step of:

producing a vacuum in the preparation system for substantially removing or preventing a gas from entering into the molding mass.

4. The method for preparing a molding mass according to claim 1 further comprising the steps of:

providing a target mold in an open configuration; and depositing a select portion of the molding mass into the target mold for filling a detail of the mold;

wherein the select portion has a select portion volume less than a volume of the target mold.

5. The method for preparing a molding mass according to claim 4 further comprising the steps of:

closing the target mold as necessary; and heating the target mold filled with the molding mass to a select curing temperature in a range of 185° C. to 225° C. for a select curing time period for thermally curing the molding mass for forming the molded article having a second plastic-elastic texture and consistency characterized by a molded article residual liquid content of ≤6 wt. % based on a total mass of the molded article;

wherein after thermal curing, no substantial steam pressure remains in a structural matrix of the molded article; and wherein after thermal curing, the molding mass is solidified beyond a glass point of the structural matrix of the molded article.

6. The method for preparing a molding mass according to claim 5 further comprising the steps of:

passing the molded article into an enclosed humidification section or chamber; and providing a humid air flow into the humidification section or chamber until the molded article has a water activity in a range of 0.45 to 0.70;

wherein a safe microbiological condition is maintained in the enclosed humidification section or chamber.

* * * * *